(12) United States Patent
Huber et al.

(10) Patent No.: US 11,999,105 B2
(45) Date of Patent: Jun. 4, 2024

(54) CONSTRUCTION BOX SYSTEM FOR A 3D PRINTER, 3D PRINTER, 3D PRINTER SYSTEM, USE OF THE CONSTRUCTION BOX SYSTEM, AND 3D PRINTING METHOD

(71) Applicant: ExOne GmbH, Gersthofen (DE)

(72) Inventors: Thomas Huber, Aichach (DE); Michael Fischer, Markt Indersdorf (DE); Roland Ladewig, Windeby (DE)

(73) Assignee: ExOne GmbH, Gersthofen (DE)

( * ) Notice: Subject to any disclaimer, the term of this patent is extended or adjusted under 35 U.S.C. 154(b) by 8 days.

(21) Appl. No.: 17/609,570

(22) PCT Filed: May 7, 2020

(86) PCT No.: PCT/EP2020/062666
§ 371 (c)(1),
(2) Date: Nov. 8, 2021

(87) PCT Pub. No.: WO2020/225345
PCT Pub. Date: Nov. 12, 2020

(65) Prior Publication Data
US 2022/0227048 A1    Jul. 21, 2022

(30) Foreign Application Priority Data

May 9, 2019    (EP) .................................. 19173550

(51) Int. Cl.
*B29C 64/25*        (2017.01)
*B29C 64/165*       (2017.01)
(Continued)

(52) U.S. Cl.
CPC ............ *B29C 64/25* (2017.08); *B29C 64/165* (2017.08); *B29C 64/232* (2017.08);
(Continued)

(58) Field of Classification Search
CPC ...... B29C 64/25; B29C 64/255; B29C 64/259
See application file for complete search history.

(56) References Cited

U.S. PATENT DOCUMENTS 6,554,600 B1    4/2003  Hofmann et al.
7,357,629 B2 *  4/2008  Weiskopf ............... B33Y 30/00
                                                  425/188
(Continued)

FOREIGN PATENT DOCUMENTS

CN    106001416 B    10/2016
CN    106001417 A    10/2016
(Continued)

OTHER PUBLICATIONS

Notice of Reasons for Refusal for the corresponding JP Patent Application No. 2021-566205, dated Dec. 6, 2022, 6 pages (For informational purposes only).
(Continued)

*Primary Examiner* — Timothy Kennedy
(74) *Attorney, Agent, or Firm* — Viering, Jentschura & Partner mbB; Robert M Bilotta, Jr.

(57) ABSTRACT

Disclosed is a construction box system 10 for a 3D printer 12, comprising a construction box 30 having a side wall structure 32 and a construction platform 34 received within the side wall structure 32, the side wall structure 32 limiting an upwardly open construction box interior space 36 for building up a component by 3D printing, which interior space is downwardly limited by the construction platform 34, and a support structure 50 comprising its own drive 52 integrated into the support structure 50 and to which the construction box 30 is releasably attachable, such that the construction box 30 can be repeatedly removed from the support structure 50 after building up the component in the
(Continued)

construction box interior space 36 and subsequently reattached to the support structure 50.

20 Claims, 20 Drawing Sheets

(51) Int. Cl.
*B29C 64/232* (2017.01)
*B29C 64/236* (2017.01)
*B29C 64/245* (2017.01)
*B29C 64/264* (2017.01)
*B29C 64/295* (2017.01)
*B33Y 10/00* (2015.01)
*B33Y 30/00* (2015.01)

(52) U.S. Cl.
CPC .......... *B29C 64/236* (2017.08); *B29C 64/245* (2017.08); *B29C 64/264* (2017.08); *B29C 64/295* (2017.08); *B33Y 10/00* (2014.12); *B33Y 30/00* (2014.12)

(56) References Cited

U.S. PATENT DOCUMENTS

| | | | |
|---|---|---|---|
| 8,951,033 B2* | 2/2015 | Hochsmann | B29C 64/165 425/375 |
| 10,603,717 B2* | 3/2020 | Grant | B29C 64/245 |
| 10,821,666 B2* | 11/2020 | Hofmann | B33Y 30/00 |
| 11,420,261 B2* | 8/2022 | Herzog | B33Y 30/00 |
| 2002/0025244 A1* | 2/2002 | Kim | H01L 21/67775 414/217 |
| 2007/0057412 A1 | 3/2007 | Weiskopf et al. | |
| 2008/0053998 A1 | 3/2008 | Hochsmann et al. | |
| 2013/0004607 A1 | 1/2013 | Hoechsmann et al. | |
| 2013/0241095 A1 | 9/2013 | Korten et al. | |
| 2015/0314389 A1 | 11/2015 | Yamada | |
| 2017/0341302 A1 | 11/2017 | Hoechsmann et al. | |
| 2018/0133966 A1* | 5/2018 | Plachner | B22F 12/82 |
| 2018/0169894 A1 | 6/2018 | Höchsmann et al. | |
| 2019/0022742 A1 | 1/2019 | Todorov et al. | |
| 2019/0160798 A1* | 5/2019 | Jen | B29C 64/25 |

FOREIGN PATENT DOCUMENTS

| | | | | |
|---|---|---|---|---|
| CN | 106457690 A | | 2/2017 | |
| DE | 202004018586 U1 | | 3/2005 | |
| DE | 202006010327 U1 | | 11/2007 | |
| DE | 102009056696 A1 | | 6/2011 | |
| JP | 2002527613 A | | 8/2002 | |
| JP | 2015193187 A | | 11/2015 | |
| JP | 2016221875 A | | 12/2016 | |
| JP | 2018047597 A | | 3/2018 | |
| JP | 2018526218 A | | 9/2018 | |
| WO | 2017177603 A1 | | 10/2017 | |
| WO | WO-2017194142 A1 * | | 11/2017 | B22F 10/20 |

OTHER PUBLICATIONS

International Search Report for International application No. PCT/EP2020/062666, dated Sep. 7, 2020, 4 pages (For informational purposes only).

Examination Report for corresponding Indian patent application No. 202117056363, dated Jun. 10, 2022, 7 pages (For informational purposes only).

First Search Report issued for the corresponding Chinese patent application No. 2020800344489, dated Mar. 29, 2024, 1 page (for informational purposes only).

* cited by examiner

CONSTRUCTION BOX SYSTEM FOR A 3D PRINTER, 3D PRINTER, 3D PRINTER SYSTEM, USE OF THE CONSTRUCTION BOX SYSTEM, AND 3D PRINTING METHOD

The present invention relates to a construction box system for a 3D printer, a 3D printer comprising the construction box system, a 3D printer system comprising the 3D printer, a use of the construction box system, and a 3D printing method.

Various generative manufacturing processes and 3D printing processes (and consequently various types of 3D printers, i.e. machines/constructions for building up a component in layers) are known.

Some generative manufacturing processes have the following steps in common:

(1) First, particulate material (and particulate construction material, respectively) is applied over the entire surface of/continuously on a construction field, so as to form a layer of unsolidified particulate material.

(2) The applied layer of unsolidified particulate material is selectively solidified in a predetermined partial area (in accordance with the component part to be manufactured), for example by selectively printing a treatment agent, for example a binder, alternatively, for example, by laser sintering.

(3) Steps (1) and (2) are repeated to manufacture a desired component. For this purpose, a construction platform on which the component is built up in layers may, for example, be lowered by respectively one layer thickness before a new layer is applied (alternatively, the coater and the printing device may, for example, be raised by respectively one layer thickness).

(4) Finally, the manufactured component which is formed by the solidified partial areas and is supported and surrounded by loose, unsolidified particulate material may be unpacked.

The construction space in which the component or the components is/are manufactured may, for example, be defined by a so-called construction box (also referred to as "job box" or "swap container"). A construction box of this type may have a circumferential wall structure which is open in an upward direction and extends in a vertical direction (for example formed by four vertical side walls), which may, for example, be formed to be rectangular when viewed from above. A height-adjustable construction platform may be received in the construction box. In this respect, the space above the construction platform and between the vertical circumferential wall structure may for example at least contribute to forming the construction space. An upper area of the construction space may, for example, be referred to as a construction field. An example of a construction box is, for example, described in DE 10 2009 056 696 A1. Another example of a construction box is, for example, described in DE 20 2006 010 327 U1.

A coater (also referred to as a "recoater") is normally used in the above step (1). Various coaters are known for use in 3D printers, by means of which a particulate construction material may be applied to the construction field (also referred to as construction surface or construction area) in the form of a uniform layer over the entire surface/a continuous layer.

One type of coater uses a roller (short: "roller coater") in front of which first an amount of particulate construction material is put down and which is then horizontally moved across the construction field to apply the particulate construction material in the form of a uniform layer onto the construction field. In this respect, the roller may be rotated opposite to the moving direction.

Another kind of coater (a so-called "container coater", for example a "slot coater") uses a container which defines an inner cavity for receiving particulate construction material, and has an (for example elongate) output region, for example comprising an (for example elongate) output slot, for outputting the particulate construction material. The container coater may, for example, be movable across a/the construction field (for example horizontally, for example transverse to its longitudinal direction), wherein the particulate material can be output onto the construction field through the (elongate) output region to thereby apply a uniform construction material layer continuously/over the entire surface of the construction field and the construction platform, respectively. The coater may be elongate, for example, to span or to cover the length or width of a rectangular construction field or construction space.

In the above step (2), a printing device having a print head may for example be used, which applies a treatment agent in a controlled way onto a partial area of a/the particulate material layer applied before (so-called binder jetting). The treatment agent contributes to a (direct and/or later) solidification of the construction material layer in the partial area. For example, the treatment agent may be/contain a binding agent, for example binder, for example a binder component of a multicomponent binder.

Alternatively, a laser may, for example, be used in the above step (2) to solidify a partial area of the construction material layer applied previously, in particular by sintering or melting the particulate material in the partial area.

It may be regarded as an object of the present invention to provide a construction box system for a 3D printer and a 3D printing method by which a component can be efficiently manufactured by 3D printing.

To this end, the present invention provides a construction box system for a 3D printer according to claim 1, a 3D printer according to claim 12, a 3D printer system according to claim 13, a use of the construction box system according to claim 14, and a 3D printing method according to claim 15.

According to various aspects of the invention, a construction box system for a 3D printer comprises a construction box having a side wall structure (for example, a construction box side wall structure) and a construction platform received within the side wall structure, the side wall structure defining an upwardly open construction box interior space (for example, construction space) for building a component (for example, at least one component, for example, one or more components) in 3D printing (for example, by means of a 3D printing method) which is downwardly delimited by the construction platform, and a support structure comprising its own drive integrated into the support structure and to which the construction box is releasably (for example repeatedly, for example multiple times) attachable (for example fixable, for example attached, for example fixed) so that the construction box can be repeatedly removed (for example detached and removed) from the support structure after building the component in the construction box interior space and subsequently reattached (for example fixed, for example attached and fixed) to the support structure.

Since the construction box is detachable from the support structure, the construction box can be fed, for example separately from the support structure, to a process following the 3D printing (so-called post-process), such as an unpacking and/or curing and/or drying of the component produced in the construction box. Meanwhile, another construction box can be arranged on the support structure, for example, so that 3D printing can be performed or a component can be built up in 3D printing in the other construction box, for example, in parallel/simultaneously with the post-process performed in one construction box. This enables, for example, low idle times of the individual components of the construction box system (such as the construction box(es) and/or the support structure). Since the support structure has its own drive integrated into the support structure, the construction box can, for example, be configured free of a drive means (i.e., without its own drive integrated into the construction box). This enables, for example, a simple and cost-effective assembly of the (for example respective) construction box, while nevertheless enabling simple handling of the construction box by means of the (for example common) support structure. In addition, the construction box can then be made accessible to, for example, post-processes of the type having conditions that are detrimental to the support structure and its drive. Thus, the construction box system enables, for example, an efficient implementation of 3D printing processes and/or an efficient production of 3D printed components and/or an efficient operation of a 3D printer or a 3D printer system.

For example, the side wall structure of the construction box may have at least one side wall (for example, four side walls). For example, the side wall structure of the construction box may be formed by four side walls (for example, construction box side walls). The construction box side wall structure (for example, the four construction box side walls) may have, for example, a rectangular shape in a plan view, for example comprising two long and two short sides.

The drive integrated into the support structure may comprise, for example, a lift drive (for example, a construction platform lift drive) for adjusting the height of the construction platform, configured to adjust the construction platform of the construction box in height when the construction box is attached to the support structure.

With a/the lift drive integrated into the support structure, the construction platform can be moved, for example, in a controlled and automated manner between an uppermost position, in which the construction platform is arranged at the beginning of a/the 3D printing process, and a lowermost position, in which the construction platform is held by a/the holding structure (for example, the holding structure described below) (and in which the construction platform is arranged, for example, at the end of a/the 3D printing process). For this purpose, the lift drive may, for example, be coupled or connected to a control device (for example, a central control device of the 3D printer, for example, a control device integrated into the support structure). A device integrated into the construction box for adjusting the height of the construction platform may therefore be omitted. A device integrated into the 3D printer or provided on the 3D printer for adjusting the height of the construction platform may also be omitted.

The drive integrated in the support structure may, for example, comprise a travel drive (for example, a support structure travel drive) for moving the support structure, which is configured to move the construction box system (for example, the support structure with the construction box arranged thereon) between a first position (for example, a build position), in which the construction box system is arranged in the 3D printer for building up the component, and a second position in which the construction box system is arranged, for example, outside the 3D printer, for example along a rail system or a roller system extending between the first position and the second position.

With a/the travel drive integrated into the support structure, the construction box system may be moved between the first position and the second position, for example, in a controlled and automated manner. For this purpose, the travel drive may, for example, be coupled or connected to a/the control device (for example, a/the central control device of the 3D printer, for example, a/the control device integrated into the support structure). A separate device for moving the construction box system or the support structure may therefore be omitted. A device integrated into the 3D printer or provided on the 3D printer for moving the construction box system or the support structure may also be omitted.

The second position may be, for example, a position for detaching (and, for example, removing) a/the construction box from the support structure and/or attaching (and, for example, fixing) it to the support structure. The second position may be, for example, a position for detaching and removing a/the construction box from the support structure and/or for attaching a/the construction box to the support structure and/or for changing or replacing a/the construction box on the support structure. The second position may be, for example, a construction box change position and/or a construction box exchange position.

If the travel drive and/or the lift drive are integrated into the support structure of the construction box system, corresponding devices of the 3D printer for height adjustment of the construction platform and/or for moving the support structure and/or the construction box system between a/the first position and a/the second position, for example, may be omitted. This can, for example, simplify the assembly of the 3D printer. In addition, for example, maintenance work on the travel drive and/or lift drive can be carried out easily and at low cost outside the 3D printer, while the 3D printer may meanwhile continue to be operated, for example, with another construction box system.

The travel drive and/or the lift drive may, for example, each be configured as at least one electric motor. For example, several electric motors may be provided in each case as the travel drive and/or as the lift drive, which are controlled for synchronous operation or are coupled to one another. The travel drive may, for example, be formed by one electric motor and the lift drive may, for example, be formed by two electric motors synchronized with one another. The travel drive and/or the lift drive may, for example, have a vertical drive axis.

The support structure may be electrically connected, for example, via a trailing or rolling cable chain, to the 3D printer, for example, to a/the central control device of the 3D printer, which may be configured, among other things, to control the travel drive and/or the lift drive, and/or to a central power supply of the 3D printer. For controlling the travel drive and/or the lift drive, however, the support structure may, for example, also comprise a control device integrated into or arranged on the support structure. For the power supply of the travel drive and/or the lift drive, the support structure may, for example, also be formed with an accumulator or comprise an accumulator.

The lift drive may, for example, be configured to drive at least one (for example, two) spindle drives arranged on the support structure. The lift drive may, for example, drive at least one (for example, two) spindle drive(s) arranged on the support structure. For example, the support structure may include at least one (for example, two) spindle drive(s) attached to the support structure and drivable or driven by the lift drive. The spindle drive (for example, each of the two spindle drives) may comprise, for example, a (for example, rotatable) screw spindle and a spindle nut. The spindle drive or screw spindle may be rotatably disposed, for example, adjacent to a support structure side wall structure and a support structure side wall, respectively. The screw spindle may, for example, be connected to the lift drive (for example fixedly, for example releasably, for example by means of a coupling). For example, two electric motors may be provided as the lift drive, each of which drives a spindle drive, wherein each spindle drive comprises, for example, a rotatable screw spindle and a spindle nut, and wherein the two spindle drives are arranged, for example, adjacent to opposite support structure side walls. The spindle drive or rotatable screw spindle may comprise, for example, a vertical axis of rotation.

The travel drive may, for example, be configured to drive at least one gear wheel fixed to the support structure. For example, the travel drive may drive at least one gear wheel fixed to the support structure. For example, the support structure may comprise at least one gear wheel attached to the support structure, which is drivable or driven by the travel drive. For example, the gear wheel may be connected to the travel drive (for example fixedly, for example releasably, for example by means of a coupling). The gear wheel may be attached, for example, to the lower side of the support structure. The gear wheel may be attached, for example, to an outer side of the support structure, for example, in a lower region of the outer side. The gear wheel may comprise, for example, a vertical wheel plane or a horizontal wheel plane. The gear wheel may be, for example, a vertical gear wheel or a horizontal gear wheel. For example, there may be several gear wheels attached to the support structure, which are driven by a common electric motor via a gearbox or by synchronously running separate electric motors. The gear wheel fixed to the support structure may, for example, cooperate with a rack. For this purpose, the gear wheel may, for example, engage the rack and roll on the rack when driven by the travel drive, so that the construction box system is movable along the rack. The rack may, for example, comprise a lateral tooth surface in which a gear wheel with a horizontal wheel plane engages laterally. The rack may be arranged, for example, between two rolling or sliding rails, for example adjacent to one of the two rolling or sliding rails, of a/the rail system along which the support structure may slide/roll with skids. Alternatively, the rack may be formed, for example, by one of the two rolling or sliding rails on which the support structure stands, for which purpose the side surface of the rolling or sliding rail is provided with teeth.

The lift drive and/or the travel drive and/or the spindle drive may, for example, be arranged outside the side wall structure of the construction box when the construction box is attached to the support structure, for example as seen from above in a top view of the construction box system next to the construction box adjacent to the side wall structure of the construction box and/or adjacent to at least one side wall of the support structure, for example in the case of an elongated construction box in the longitudinal direction in front of and/or behind the side wall structure of the construction box and/or in front of and/or behind at least one side wall of the support structure. As a result, the construction box system may be designed, for example, with a low height and thus in a way to be compact. Furthermore, for example, the lift drive and/or the travel drive and/or the spindle drive may be easily accessible.

For example, the support structure may be formed to be elongated and the lift drive and/or the travel drive and/or the spindle drive may be arranged, for example, at at least a longitudinal end of the support structure. For example, the travel drive may be arranged at a first longitudinal end of the support structure and the lift drive may be arranged at the first and at a second longitudinal end of the support structure. As a result, the construction box system may, for example, have a low height and thus be formed to be compact. Furthermore, for example, the lift drive and/or the travel drive and/or the spindle drive may be easily accessible.

The construction platform may, for example, be engaged from below/reached under by one or more support structures (for example adjustable in a vertical direction or height direction), for example one or more support arms (for example comprising an L-structure), which are connected to the lift drive (for example fixedly, for example releasably, for example by means of a coupling) and can be driven by it when the construction box is attached to the support structure. In the side wall structure of the construction box and/or in a support structure side wall structure, for example, one or more slots (for example longitudinal slots extending in a height direction) may be formed through which the one or more support structures extend. The slots may extend, for example, from a lower end (for example, a lower edge) of the support structure side wall structure or the construction box side wall structure in an upward direction (for example, vertically upward). For example, the slots may be configured (for example, have an extension (for example, length) in the height direction (or vertical) direction)) such that the construction platform is movable between a lowermost position where the construction platform is held by a holding structure (for example, the holding structure described below) and an uppermost position where a floor (for example, an upper part or upper portion, for example, a work surface) of the construction platform is arranged substantially level with an upper edge of the construction box side wall structure (and in which the construction platform is arranged at the beginning of a/the 3D printing process). For example, the support structure may be connected to the spindle nut (for example, fixedly, for example, releasably), for example, via a support structure fastening member to which the support structure is fastened and which is connected to the spindle nut (for example, fixedly, for example, releasably). In this way, for example, a safe and reliable height adjustment of the construction platform can be achieved. In addition, the construction box system can thereby be designed to be compact and reliable, for example.

The one or more support structures may, for example, be adjustable or adjusted in a height direction (or vertical direction) by means of the lift drive. The one or more support structures may, for example, each extend through an associated slot in the support structure side wall structure, for example through an associated slot in a support structure side wall, for example towards an opposite support structure side wall. The one or more support structures may, for example, be configured to releasably contact the construction platform when the construction box is attached to the support structure, for example such that the construction platform is height-adjustable by a vertical movement (or a movement in a height direction) of the support structures.

For example, the lift drive and/or the travel drive and/or the spindle drive may be disposed in a space formed between a support structure side wall and a cladding wall of the support structure. Thereby, for example, the lift drive and/or the travel drive and/or the spindle drive can be easily accessible.

For example, the support structure may comprise a support structure side wall structure that surrounds the side wall structure of the construction box in the circumferential direction at least in sections, for example surrounds it at both end faces of an elongated construction box, for example completely surrounds it at both end faces of an elongated construction box, for example when the construction box is attached to the support structure. The support structure side wall structure may, for example, be formed in a shape corresponding to the side wall structure of the construction box. For example, the support structure side wall structure may be complementary in shape to the side wall structure of the construction box. For example, the support structure side wall structure may have at least one support structure side wall (for example, two support structure side walls). Thereby, for example, an easy attachment of the construction box to the support structure and/or easy removal of the construction box from the support structure may be achieved.

For example, the support structure and/or the support structure side wall structure may have two opposing support structure side walls between which the construction box is attachable, for example such that portions of the side wall structure of the construction box (for example, two short construction box side walls) are disposed adjacent to the support structure side walls (for example, to portions of the support structure side walls) (for example, at a distance of 5 cm or less, for example, 3 cm or less, for example, 1 cm or less), for example, when the construction box is attached to the support structure. Thereby, for example, easy attachment of the construction box to the support structure and/or easy removal of the construction box from the support structure can be achieved. The drive (for example the lift drive and/or the travel drive) may, for example, be arranged adjacent to at least one of the two support structure side walls on a side of the support structure side wall facing away from the construction box.

The support structure side wall structure may, for example, surround the side wall structure of the construction box in a circumferential direction in sections (for example, when the construction box is attached to the support structure), thereby forming at least one recess. The recess may be dimensioned, for example, such that the construction box may be laterally removed from the support structure and/or reattached to the support structure, for example, through the recess. The support structure side wall structure may, for example, comprise two opposed recesses, each of which may, for example, be dimensioned such that the construction box may, for example, be laterally removed from the support structure and/or reattached to the support structure through the respective recess. The at least one (for example both) recess may for example extend along a (respective) long side of the side wall structure of the construction box. Thereby, for example, easy attachment of the construction box to the support structure and/or easy removal of the construction box from the support structure may be achieved.

The support structure side wall structure may, for example, comprise several (for example, two) support structure side walls or may be at least co-formed (for example, formed) by these. The support structure may be formed to be elongated, for example. For example, the support structure may be formed to be rectangular in a plan view, for example having two short and two long sides. The support structure or the support structure side wall structure may comprise, for example, two support structure side walls arranged (for example in a longitudinal direction) in front of and behind the construction box (for example, adjacent to the side wall structure of the construction box, for example, adjacent to the short sides of the construction box) when the construction box is arranged on the support structure. The support structure or the support structure side wall structure may comprise, for example, a first support structure side wall and a second support structure side wall, the first support structure side wall being arranged (for example in a longitudinal direction) in front of the construction box (for example, adjacent to a first portion of the construction box side wall structure, for example adjacent to a first short side of the construction box) and the second support structure side wall being disposed (for example in a longitudinal direction) behind the construction box (for example adjacent to a second portion of the construction box side wall structure, for example adjacent to a second short side of the construction box) when the construction box is disposed on the support structure. The lift drive and/or the travel drive and/or the spindle drive may be arranged, for example, adjacent to at least one support structure side wall (for example, both support structure side walls), for example, when the construction box is arranged on the support structure, on a side of a (respective) support structure side wall facing away from the construction box.

For example, when the construction box is arranged on the support structure, the construction box may, for example, be supported by the support structure such that an upper edge of the side wall structure of the construction box is arranged substantially at the same height as an upper edge of the support structure side wall structure.

For example, the support structure may comprise at least one (for example, two) construction box support member for supporting the construction box when the construction box is disposed on the support structure. The at least one construction box support member may be arranged, for example, below the construction box when the construction box is arranged on the support structure. The at least one construction box support member may be at least co-formed, for example formed, by the support structure side wall structure (for example by the support structure side wall(s)). The at least one construction box support member may be attached, for example, to the support structure side wall structure (for example, to the support structure side wall(s)), for example, a support member may be attached to each of the two support structure side walls disposed (for example in a longitudinal direction) in front of and behind the construction box when the construction box is disposed on the support structure. For example, the support structure may comprise two opposed construction box support members. The two opposing construction box support members may, for example, each extend between the two support structure side walls and have a lower height (for example, lower extension in the vertical direction) than the support structure side walls. The two opposing construction box support members may, for example, be arranged on opposing support structure side walls.

The support structure may for example comprise two (for example opposing) support structure side walls and two (for example opposing) construction box support members, wherein for example the two support structure side walls are arranged in front of and behind the (for example elongated) construction box and/or the two support structure side walls are arranged adjacent to the side wall structure (for example to portions thereof, for example to the short sides) of the construction box when the construction box is arranged on the support structure, and wherein for example the two construction box support members are arranged such that the construction box is supported by the two construction box support members when the construction box is arranged on the support structure. Thereby, for example, easy attachment of the construction box to the support structure and/or easy removal of the construction box from the support structure may be achieved.

For example, the one or more support structures may have a lower height (for example, lower extension in the vertical direction) than the construction box support members when the support structures are in the lowermost position. Thereby, for example, easy attachment of the construction box to the support structure and/or easy removal of the construction box from the support structure may be achieved.

The support structure may, for example, comprise a construction box fixing device by means of which the construction box releasably attached to the support structure may be fixed, for example such that the construction box (for example the construction box side wall structure) is stably (for example in a fixed way, for example immovably) held in a desired position. For example, the construction box fixing device may comprise at least one bolt (for example, two or four bolts) configured to engage a bolt receiving opening provided on the construction box. For example, the construction box may be fixed in a first horizontal direction (for example, the first horizontal direction may be a longitudinal direction of an elongated construction box or an elongated support structure) by the support structure side wall structure (for example, by two support structure side walls) and fixed in a second horizontal direction perpendicular to the first horizontal direction by the construction box fixing device.

The support structure may, for example, comprise lateral guide rollers. The guide rollers may, for example, be attached to the lower side of the support structure. The guide rollers may be attached, for example, to the outer side of the support structure, for example in a lower region of the outer side. The guide rollers may have, for example, a vertical rolling axis. The guide rollers attached to the support structure may, for example, cooperate with two guide rails on which the guide rollers roll. One of the two guide rails may, for example, be formed by the rack, i.e. by the side surface of the rack which is opposite the tooth surface, for example by the outer side surface of the rack, the inner side surface of the rack being formed as the tooth surface. For example, the other guide rail may be formed by one of the two rolling or sliding rails mentioned above, for example by an inner side surface of the rail. For example, however, both guide rails may also be formed by the rolling or sliding rails, or two separate guide rails may be provided. The lateral guide rollers can be used, for example, to center the support structure along a horizontal direction perpendicular to the direction of travel, so that the construction box system can be moved specifically to the first position. Separate centering/fixing of the construction box system in the first position along the horizontal direction perpendicular to the direction of travel can thus be omitted.

The support structure may, for example, comprise two or more skids with which the support structure rests in a sliding manner on corresponding rails of a rail system. The rails of the rail system may, for example, be rolling rails, i.e. comprise rollers on which the skids roll. Alternatively, the rails of the rail system may also be sliding rails, i.e. comprise sliding surfaces on which the skids slide.

For example, the support structure may comprise a tapered alignment recess, for example a cone-shaped recess. The 3D printer (for example, a frame thereof) may have attached thereto, for example, an alignment member that is horizontally adjustable perpendicular to the direction of travel of the construction box system, the alignment member comprising a tapered end portion (for example, an alignment mandrel, for example, a cone-shaped mandrel) that laterally engages the alignment recess in the first position of the construction box system. The alignment recess of the support structure and the adjustable alignment member of the 3D printer together form a construction box system fixation system for aligning the construction box system along the construction box system travel direction and for fixing the construction box system in the 3D printer (for example, to the frame thereof). In addition, the construction box system fixation system may, for example, comprise a fixing member (for example, a bolt) arranged on the 3D printer (for example, on its frame) and having a flat-shaped end portion that is adjustably pressable against a stop plate attached to the support structure. For example, a rail on the opposite side of the support structure may serve as an abutment. Furthermore, the construction box system fixation system may, for example, comprise a sensor for determining the position of the construction box system, in particular whether the construction box system is in the first position. For this purpose, a sensor target may be attached to the support structure, for example. Furthermore, the construction box system fixation system may, for example, comprise a control system that controls a drive of the alignment member and the fixing member such that the alignment member moves into the alignment recess and the fixing member is pressed against the stop plate when the sensor detects that the construction box system is in the first position.

The construction box may have, for example, a rectangular shape in a plan view, with two opposing short construction box side walls and two opposing long construction box side walls. For example, the construction box may have a length of 1.2 m or more (for example, 1.3 m or more, for example, 1.4 m or more, for example, 1.5 m or more) and 2.0 m or less (for example, 1.9 m or less, for example, 1.8 m or less, for example, 1.7 m or less, for example, 1.6 m or less). For example, the construction box may have a width of 0.7 m or more (for example, 0.8 m or more, for example, 0.9 m or more, for example, 1.0 m or more) and 1.3 m or less (for example, 1.2 m or less, for example, 1.1 m or less). For example, the construction box may have a height of 0.3 m or more (for example, 0.4 m or more, for example, 0.5 m or more) and 0.8 m or less (for example, 0.7 m or less, for example, 0.6 m or less, for example, 0.5 m or less).

The construction box may have, for example, respectively one or more construction box side wall openings, for example in the form of one or more slots (for example, longitudinal slots), on one or more construction box side walls, for example on each of the short construction box side walls, wherein the one or more construction box side wall openings may extend, for example, vertically in an upward direction from a lower edge of the construction box side wall structure.

The construction box may, for example, comprise a holding structure (for example, a construction platform holding structure) configured to hold the construction platform in a lowermost position in the construction box. The holding structure may, for example, comprise or be at least co-formed by (for example, be formed) a plate that is fixed to, for example, the construction box side wall structure (for example, to a lower end thereof) and against which the construction platform is supported when the construction platform is in a/the lowermost position in the construction box. For example, the construction platform may rest on the plate when the construction platform is in a/the lowest position in the construction box. For example, the plate may rest on the construction box support member when the construction box is disposed on the support structure. For example, the plate may have one or more openings (for example, slots, for example, longitudinal slots) extending, for example, inwardly from an outer edge of the plate. The support structure may be configured, for example, such that the construction platform (for example, an upper part or upper portion of the construction platform, for example, a work surface of the construction platform) is disposed in its lowermost position above the one or more construction box side wall openings. The construction platform may, for example, have a thickness (for example, extension in the height direction or vertical direction) equal to or greater than the length (and, respectively, extension in the vertical direction and, respectively, in the height direction) of the construction box side wall openings. This may, for example, eliminate the need for a complex device for closing the construction box side wall openings. The holding structure may, for example, have one or more protrusions or may be at least co-formed (for example, be formed) by these, which protrusions project, for example, inwardly from the side wall structure of the construction box, for example, from the short and/or the long construction box side walls towards an opposite (construction box) side wall, and against which the construction platform is supported when the construction platform is in a/the lowermost position in the construction box.

For example, the construction box may be attachable to the support structure such that the two short construction box side walls are each disposed adjacent to a portion of the support structure side wall structure (for example, adjacent to a respective support structure side wall, for example, adjacent to one of the two support structure side walls), for example respectively at a distance of 5 cm or less (for example, 3 cm or less, for example, 1 cm or less). The construction box may have, for example, at each of the short construction box side walls, at least one (for example, two) construction box side wall opening(s) configured to allow the support structures to extend therethrough when the construction box is disposed on the support structure, such that the construction platform is height-adjustable by vertical movement (and a movement in the height direction, respectively) of the support structures, for example between a/the lowermost position in which the construction platform is held by the holding structure (for example the plate) and a/the uppermost position in which a floor (for example an upper part and an upper portion, respectively, for example a work surface) of the construction platform is arranged substantially on the same height as an/the upper edge of the construction box side wall structure (and in which the construction platform is arranged at the start of a/the 3D printing process).

The construction box may, for example, be free of a drive means. The construction box may, for example, have no active elements. For example, the construction box may be formed without a drive and/or without active elements. Thereby, the construction box may be constructed, for example, in a simple and cost-effective way.

The construction box may, for example, comprise a heating device. The heating device may be arranged, for example, on and/or in the construction platform. The side wall structure of the construction box may be, for example, made of ceramic, metal, for example, cast metal, stainless steel, or combinations thereof. The construction platform may comprise, for example, a metal floor, for example a cast metal floor, or a stainless steel floor, or a ceramic floor. Ceramic material, for example, has good transmission of microwave radiation and is therefore well suited for construction boxes that are to be subjected to a microwave post process. The construction platform may for example comprise an outlet device, for example comprising a perforated floor and a closure device, to remove particulate material from the construction box interior space.

The construction box may comprise, for example, a construction box removal device adapted to attach the construction box to and/or remove the construction box from the support structure. The construction box removal device may be arranged, for example, on the construction box side wall structure of the construction box. The construction box removal device may be arranged on the holding structure, for example the plate, for example under the plate, for example on a side of the plate facing away from the construction box interior space. The construction box removal device may, for example, comprise at least one (for example, two) forklift pockets in which a fork of a forklift may engage. This allows, for example, the construction box to be easily and quickly attached to and/or removed from the support structure and/or to be exchanged easily and quickly.

The support structure may, for example, be configured to be microwave-incompatible. A microwave-incompatible support structure is understood as being a support structure that cannot be subjected to a post-process in a microwave, for example because parts of the support structure, such as the drive, are damaged or destroyed in the process and/or because parts of the support structure are made of a material that is not suitable for microwave treatment. For example, the construction box may be configured to be microwave-compatible. By a microwave-compatible construction box is meant a construction box that can be subjected to a post-process in a microwave. For example, a drive-free construction box, i.e., a construction box without a drive, may be microwave-compatible.

For example, the construction platform may comprise a floor (for example, one of the above-mentioned floors) and a floor support structure against which the floor is supported (for example, on which the floor rests). For example, the floor may comprise one or more (for example, two, for example, four) floor plates that may be, for example, surrounded (for example, enclosed) by a floor plate frame structure. The floor support structure may have, for example, a honeycomb-shaped structure. A honeycomb-shaped structure allows, for example, a good transmission of radiation (for example microwave radiation) and is therefore well suited for construction boxes that are to be subjected to a (microwave) post process. Floor plates and/or floor plate frame structure and/or floor support structure may be made of, for example, metal, for example cast metal, stainless steel and/or ceramic. The construction platform may, for example, be replaceably or interchangeably received within the side wall structure of the construction box. For example, the construction platform may be removable from the side wall structure of the construction box. For example, a construction platform removal device may be attachable to the construction platform and configured to remove the construction platform from the side wall structure of the construction box. For example, the construction platform may be configured such that a construction platform removal device is attachable to the construction platform. The construction platform removal device may, for example, comprise or be at least co-formed (for example be formed) by several (for example, four) eyebolts, each of which may be screwed into a thread (for example, internal thread) provided on the construction platform.

The construction box system may, for example, comprise one or more further construction boxes, which may, for example, each be exchangeable for the (first) construction box and attached to the support structure. The one or more further construction boxes may, for example, be formed as described above. The one or more further construction boxes may, for example, be formed like the first construction box or may be different from the first construction box.

The construction box system may, for example, comprise one or more further construction platforms, each of which may, for example, each be exchangeable for the (first) construction platform and receivable in the side wall structure of the construction box. The one or more further construction platforms may, for example, be formed as described above. The one or more further construction platforms may, for example, be formed like the first construction platform or be different from the first construction platform.

The construction box system may, for example, comprise a rail system or roller system along which the support structure with the construction box attached to it can be moved, for example by means of its own travel drive integrated in the support structure. The rail system or roller system may, for example, be configured as described above.

The construction box system may, for example, comprise a control device configured, for example, to control the lift drive and/or the travel drive and/or the heating device and/or the outlet device. The control device may comprise, for example, a/the central control device of the 3D printer (first control device) and/or a/the control device integrated into or arranged on the support structure (second control device), wherein, for example, the control device integrated into or arranged on the support structure (second control device) may be configured to control the lift drive and/or the travel drive and/or the heating device and/or the outlet device, wherein for example the central control device (first control device) may be configured to control a coater (for example coater for application in layers of particulate material to the construction platform) and/or a print head (for example print head for selective printing of the particulate material by binder jetting method), and wherein for example the central control device (first control device) may be connected to the control device (second control device) integrated in the support structure.

According to various aspects of the invention, a 3D printer has a construction box system which may be formed, for example, as described above, and a coater for application of particulate material in layers onto the construction platform and/or a print head for selective printing of the particulate material using a binder jetting method.

According to various aspects of the invention, a 3D printer system has a 3D printer, which may be formed, for example, as described above, and, for example, one or more selected from an unpacking station for unpacking the built components from the construction box and a microwave device and/or an oven, in which the construction box is receivable, for curing and/or drying the component disposed in the construction box.

According to various aspects of the invention, the above-described construction box system, the above-described 3D printer, and/or the above-described 3D printer system may be used for 3D printing of casting molds and/or casting cores and/or for application of particulate material in layers onto the construction platform and selective printing of the particulate material using a binder jetting method.

According to various aspects of the invention, a 3D printing method includes the steps:

providing a construction box system, which may for example be formed as described above, wherein the construction box is attached to the support structure, building a component by 3D printing in the construction box interior space of the construction box, removing the construction box from the support structure, for example in an automated manner, and supplying the removed construction box to a post process, such as unpacking the built components from the removed construction box, for example in an unpacking station, and/or curing and/or drying the built components in the removed construction box, for example in a microwave device and/or an oven, and/or attaching a construction box to the support structure, for example reattaching the same construction box after the built components have been unpacked, or attaching a different construction box (changing the construction box), optionally followed by rebuilding a component by 3D printing in the construction box interior space of the construction box.

Exemplary but non-limiting embodiments of the invention are shown in the Figures and are explained in more detail below.

FIG. 3 shows a perspective view of the support structure of the construction box system for a 3D printer according to the first embodiment, with a cladding wall having been omitted.

FIG. 6 shows a perspective view of the construction box of the construction box system for a 3D printer according to the first embodiment.

FIG. 13 shows a perspective view of the support structure of the construction box system for a 3D printer according to the third embodiment, with a cladding wall having been omitted.

In the following detailed description, reference is made to the enclosed Figures which are incorporated therein and in which specific embodiments are shown by way of illustration, according to which the invention can be performed. In this respect, the terms indicating a direction, such as "up", "down", "front", "rear", etc. are used with reference to the orientation in the described Figure(s). As components of embodiments may be positioned in a number of different orientations, the terminology indicating the different directions serves for illustration and shall not be restrictive in any way.

It shall be understood that other embodiments may be used and structural or logical changes may be made without deviating from the scope of protection of this invention. It goes without saying that the features of the various exemplary embodiments described herein may be combined unless specified otherwise. Thus, the following detailed description should not be understood in a restrictive sense and the scope of protection of this invention shall be defined by the attached claims.

In this description, terms such as "connected", "attached" and "coupled" may be used to describe both a direct and indirect connection, a direct or indirect attachment and a direct or indirect coupling.

In the Figures, identical or similar elements are provided with identical reference numbers where appropriate.

The support structures, construction boxes and construction platforms shown in the figures and described below can be combined with each other in any desired manner.

Figure 1:
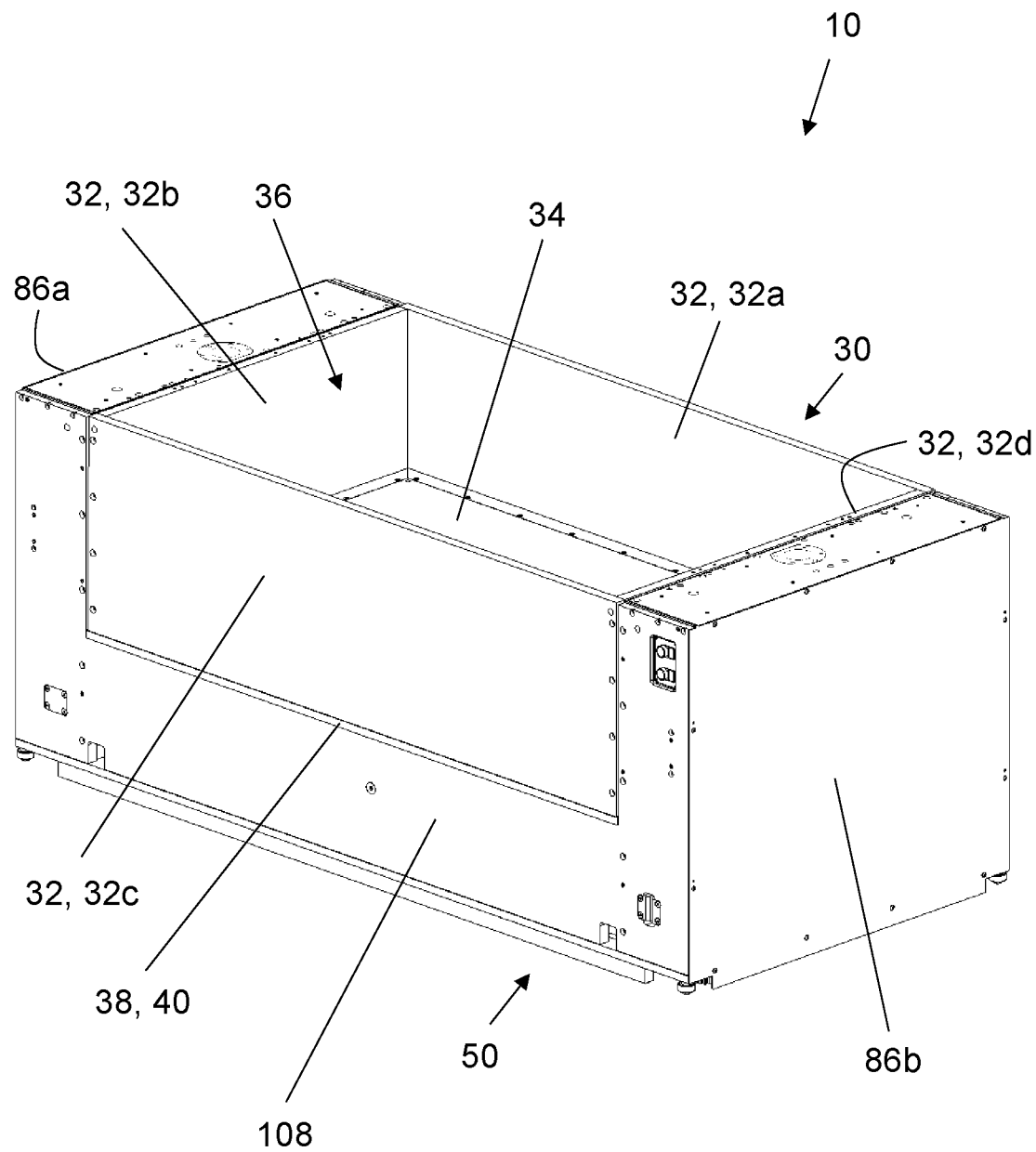
FIG. 1 shows a perspective view of a construction box system for a 3D printer according to a first embodiment.
Figure 2:
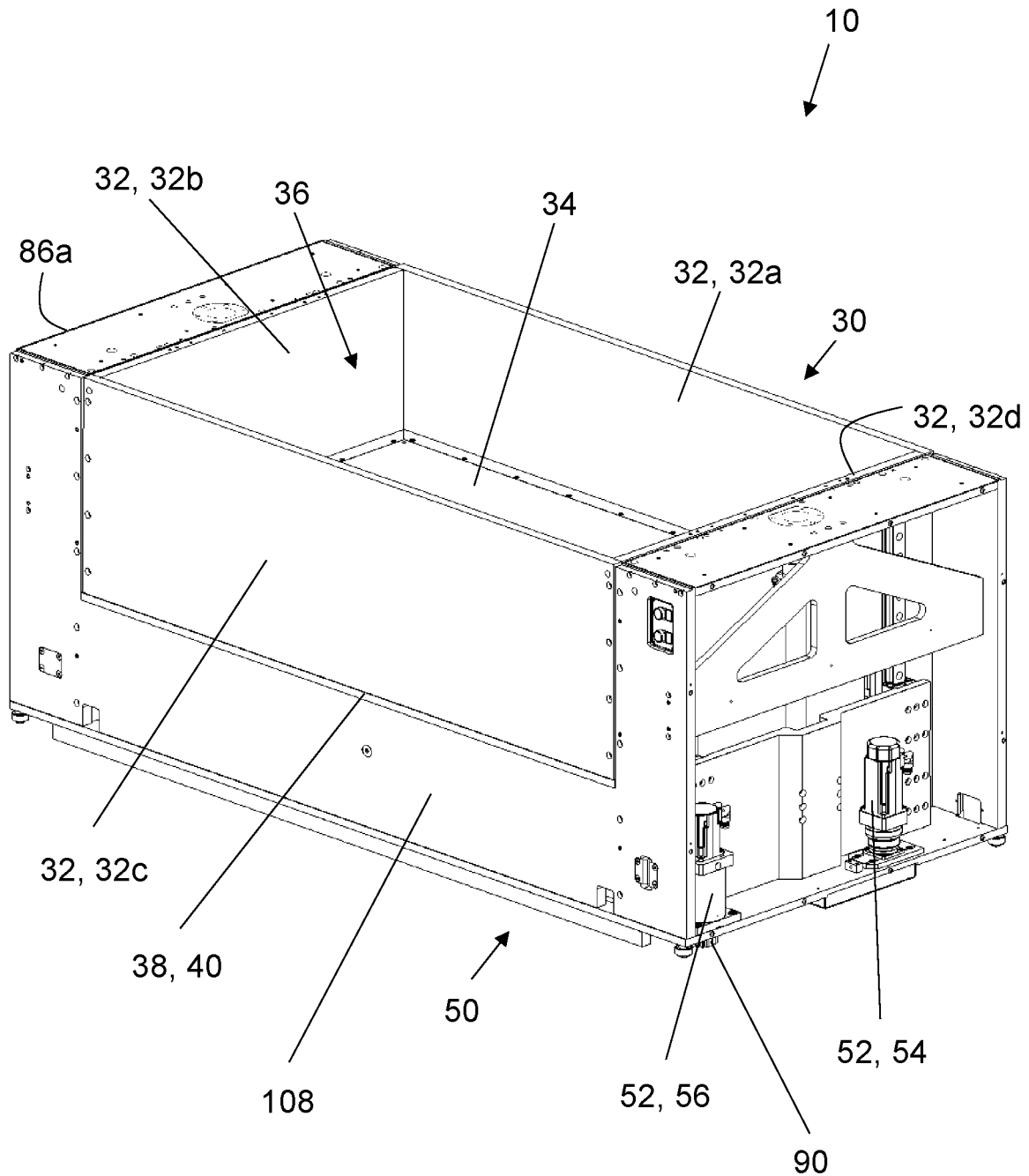
FIG. 2 shows the view from FIG. 1, with a cladding wall having been omitted.
Figure 3:
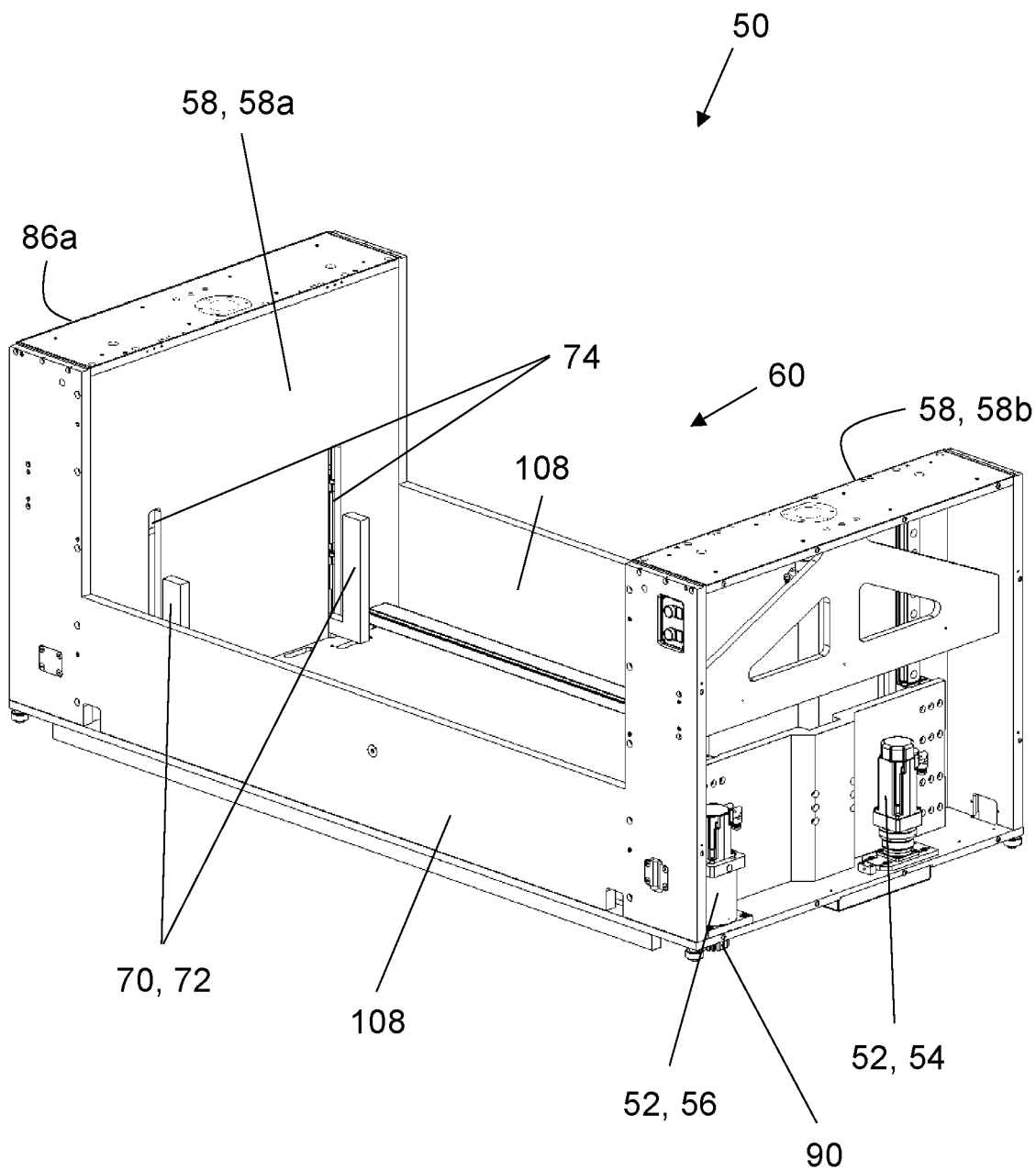
FIG. 3 shows the view from FIG. 2, with the construction box having been omitted. Thus.
Figure 4:
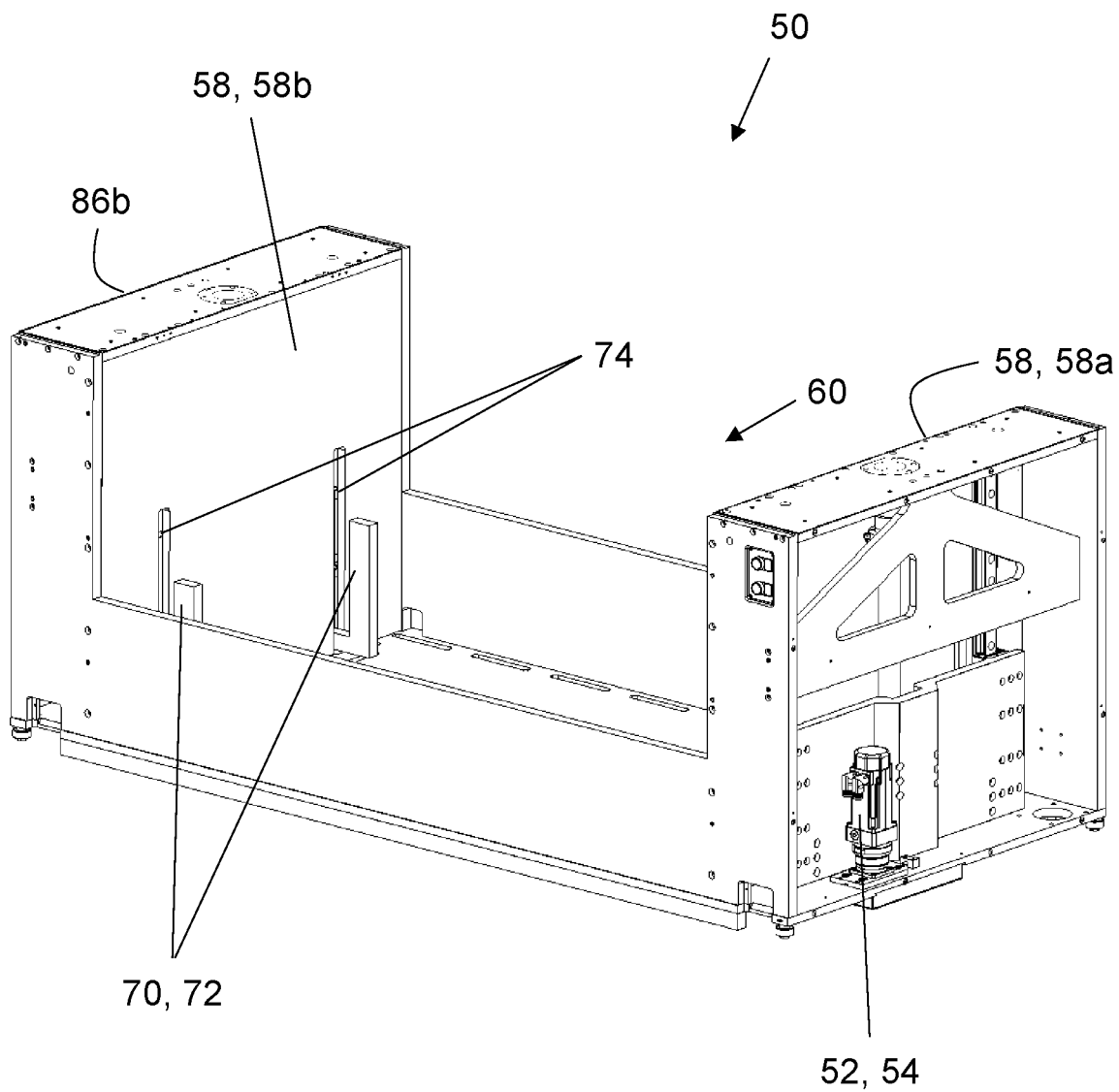
FIG. 4 shows a view of the view of the support structure shown in FIG. 3, rotated by 180° about a vertical axis of rotation, with a cladding wall having been omitted.
Figure 5:
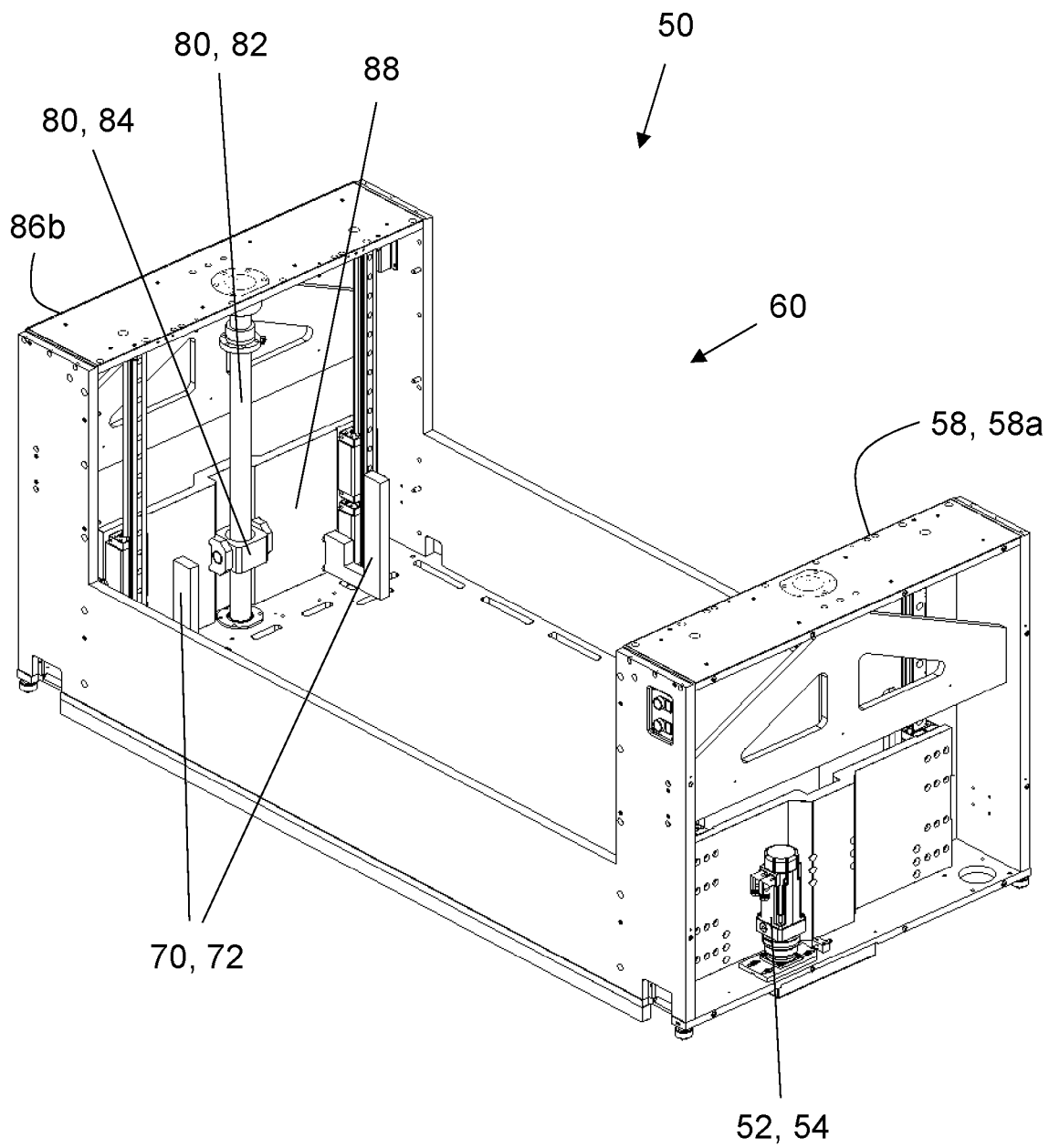
FIG. 5 shows the view from FIG. 4, with one side wall of the support structure having been omitted.
Figure 6:
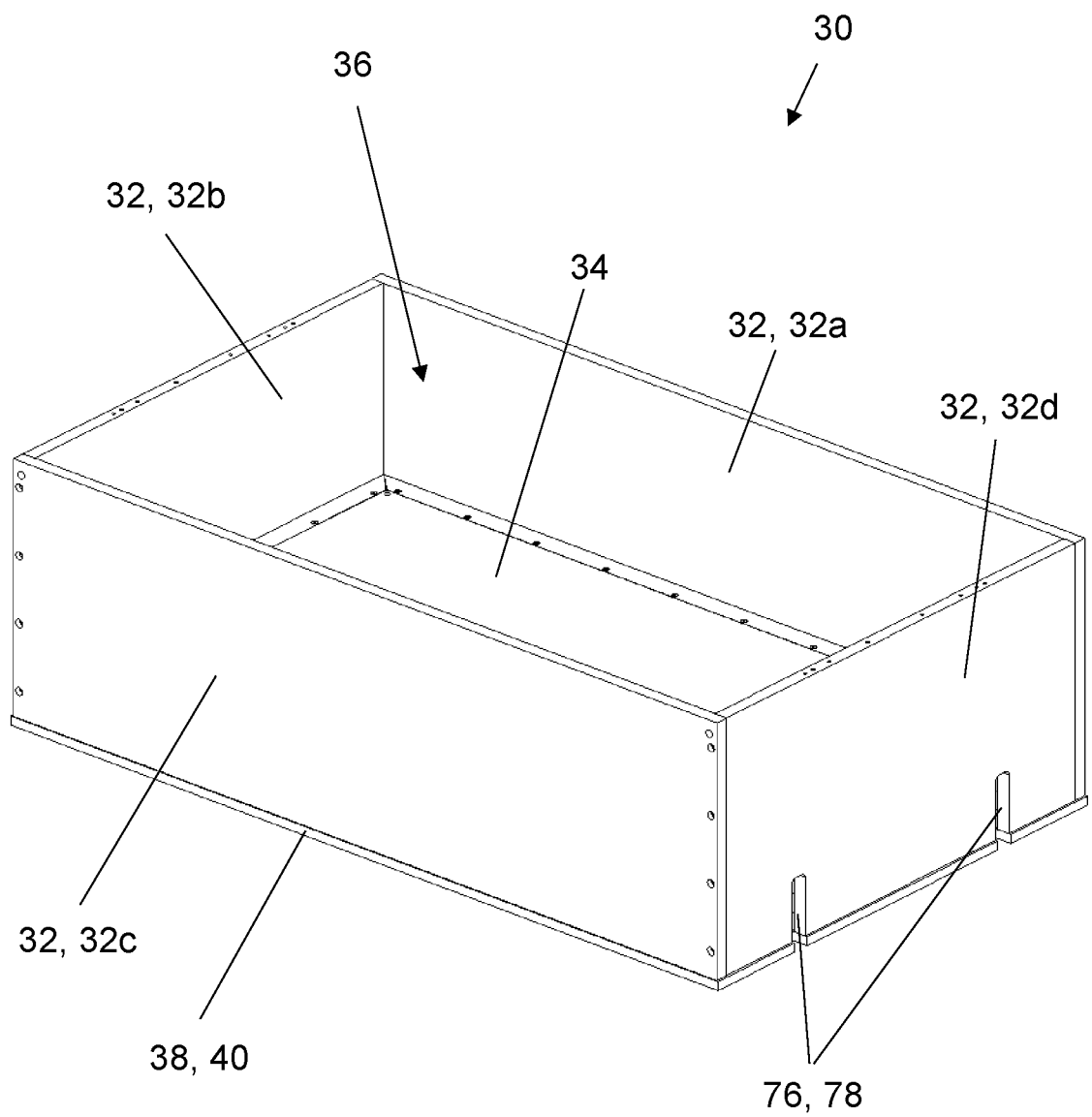
FIG. 6 shows the view from FIG. 1 with the support structure having been omitted. Thus.
Figure 7:
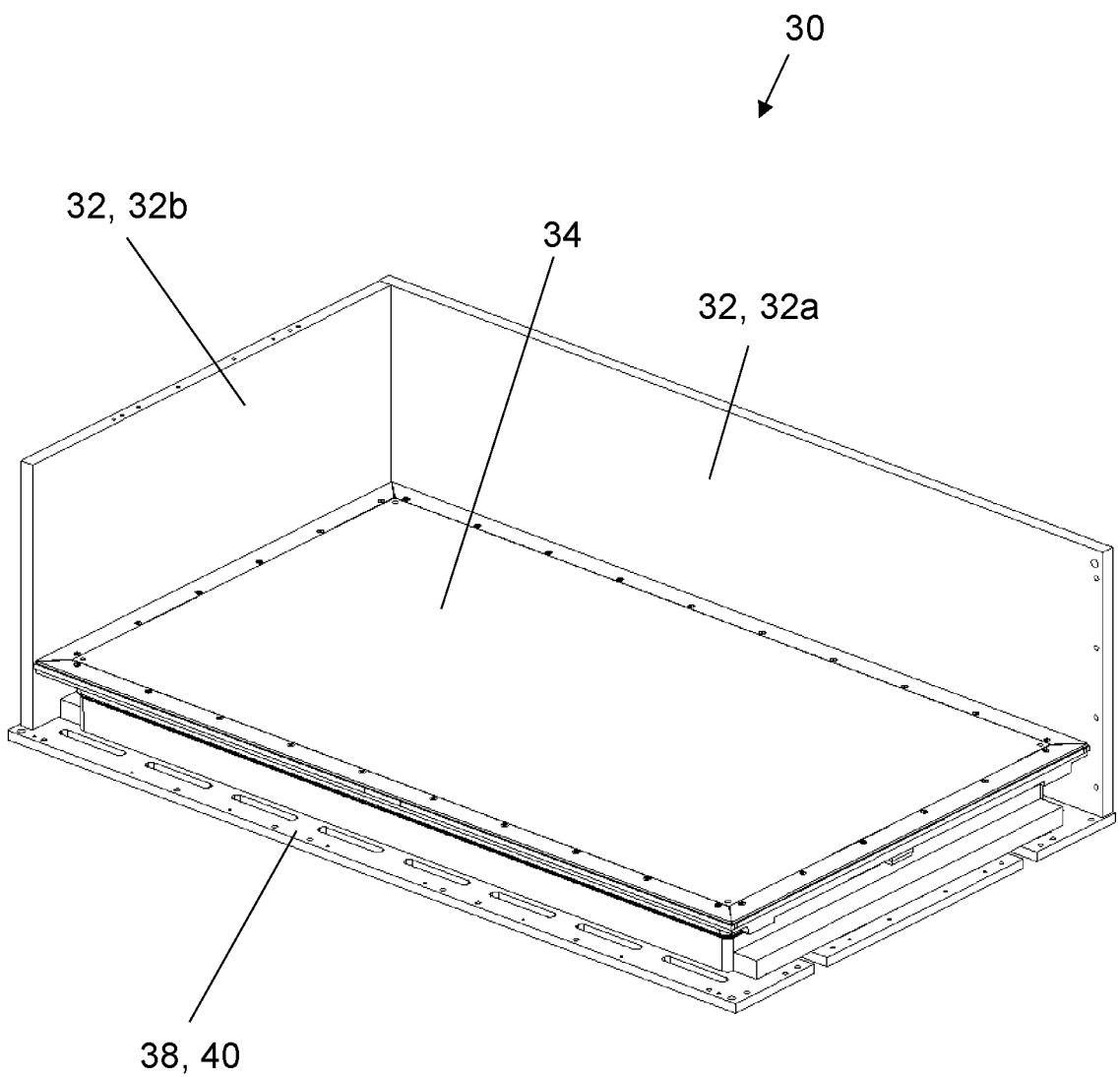
FIG. 7 shows the view from FIG. 6 with two side walls having been omitted.
Figure 8:
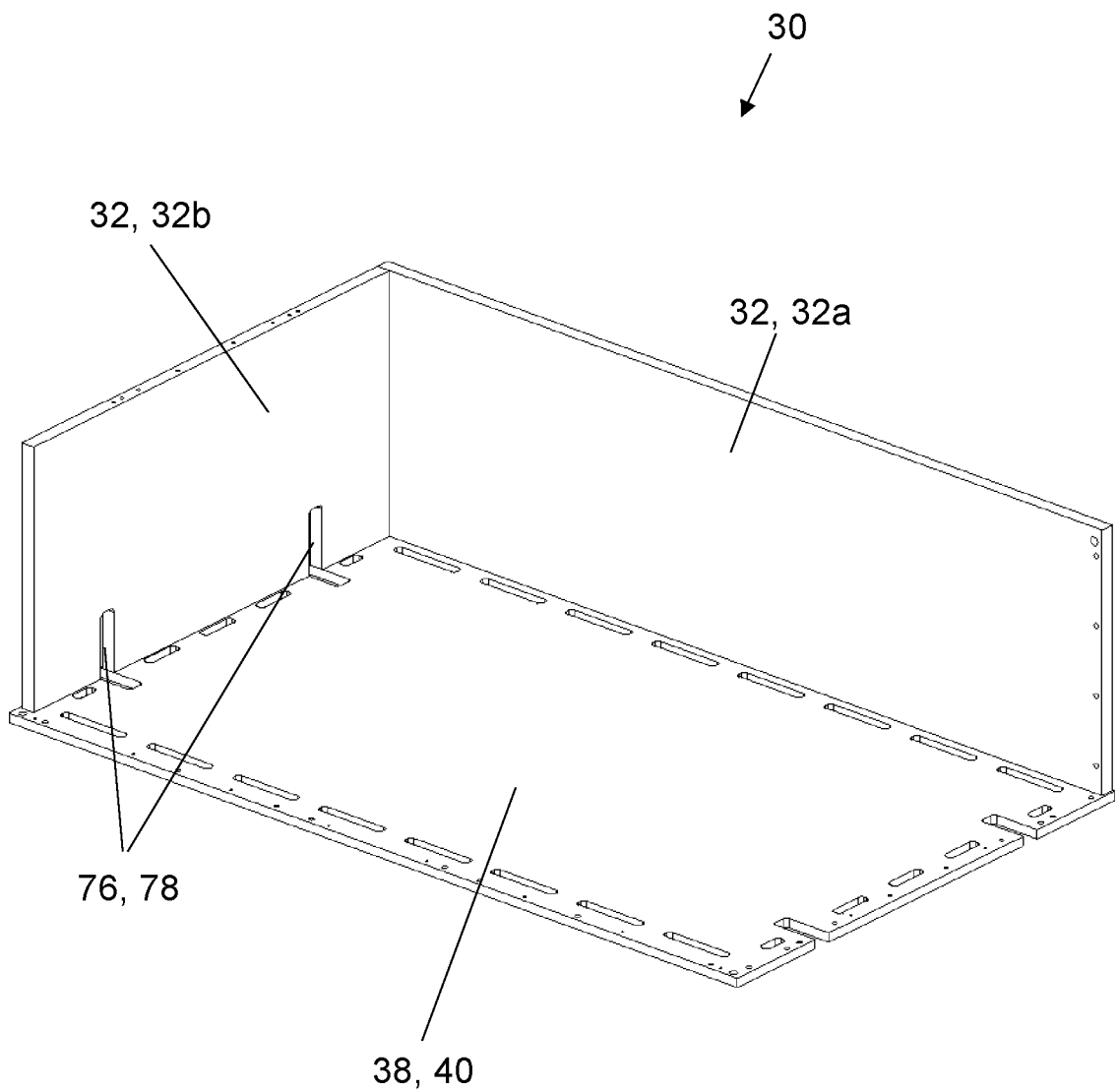
FIG. 8 shows the view from FIG. 7, with the construction platform having been omitted.
Figure 9:
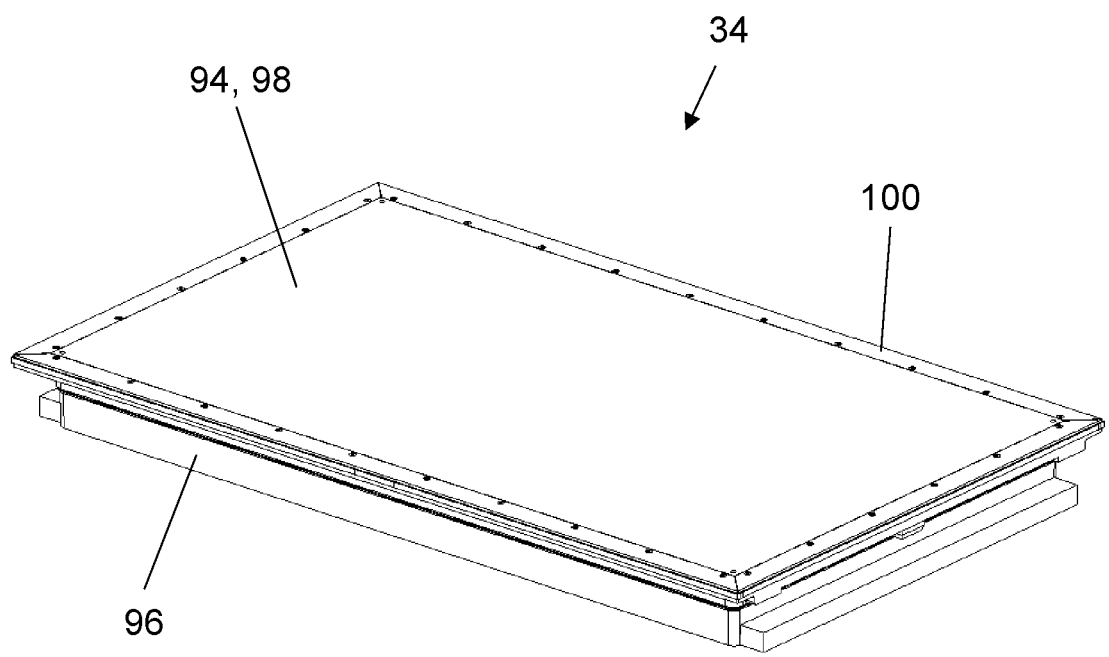
FIG. 9 shows a perspective view of the construction platform of the construction box shown in FIG. 6.
Figure 10:
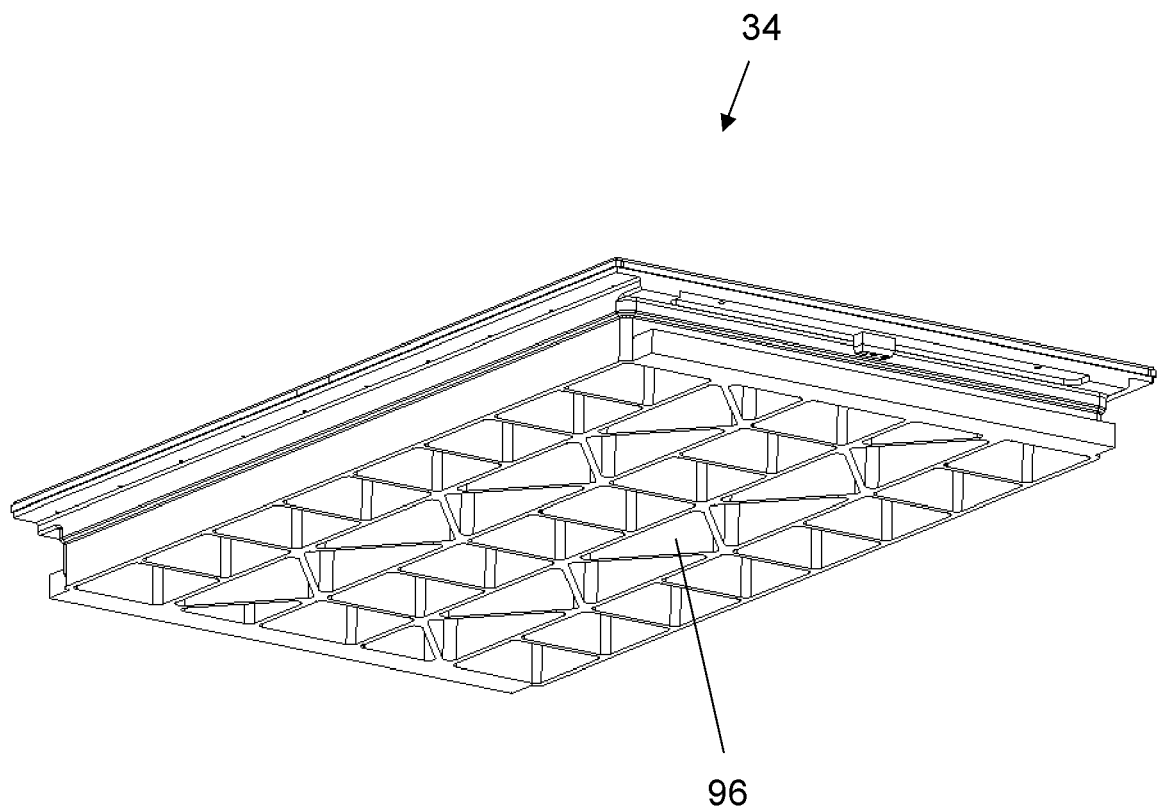
FIG. 10 shows another perspective view of the construction platform shown in FIG. 9.
Figure 11:
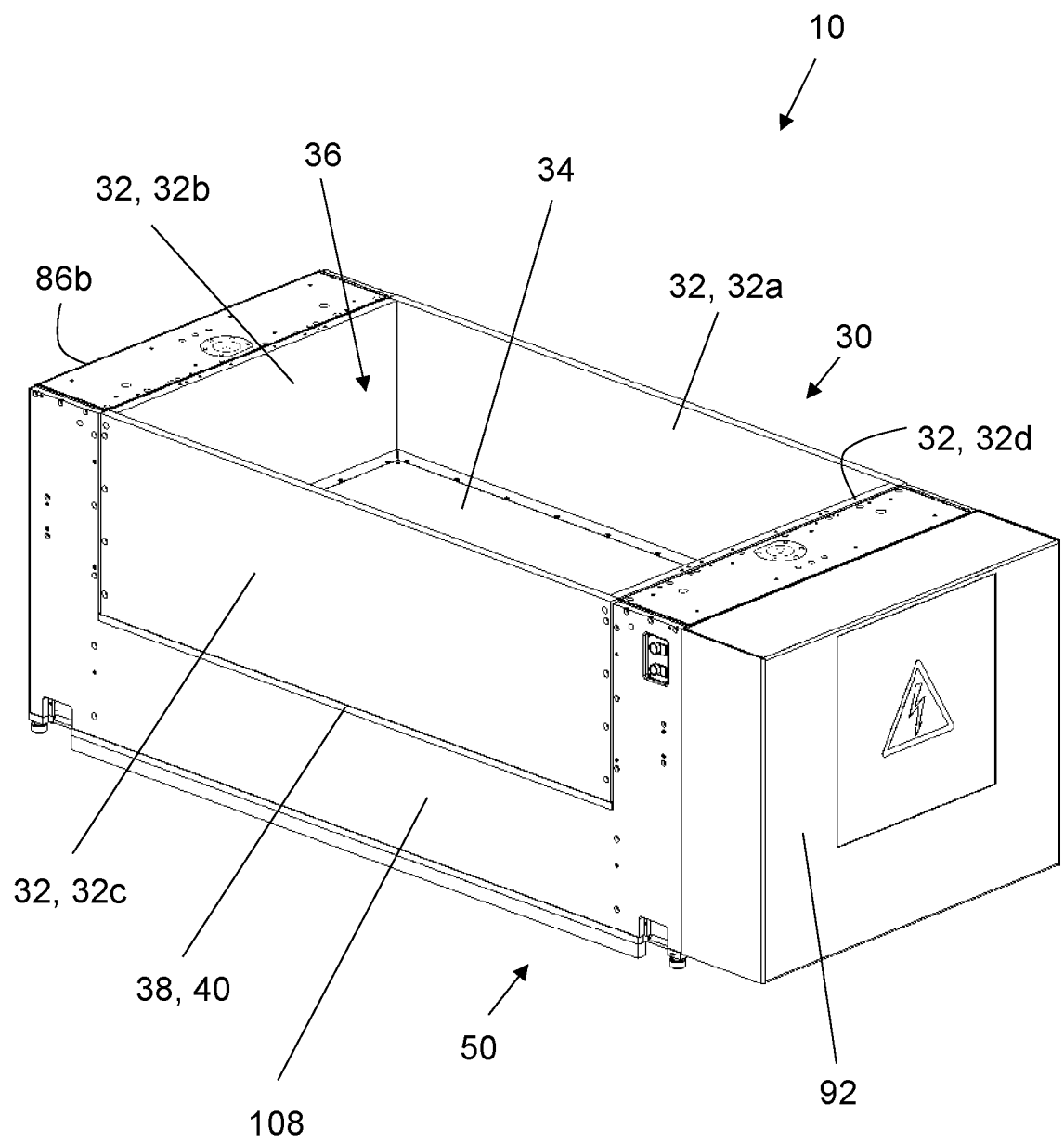
FIG. 11 shows a perspective view of a construction box system for a 3D printer according to a second embodiment.
Figure 12:
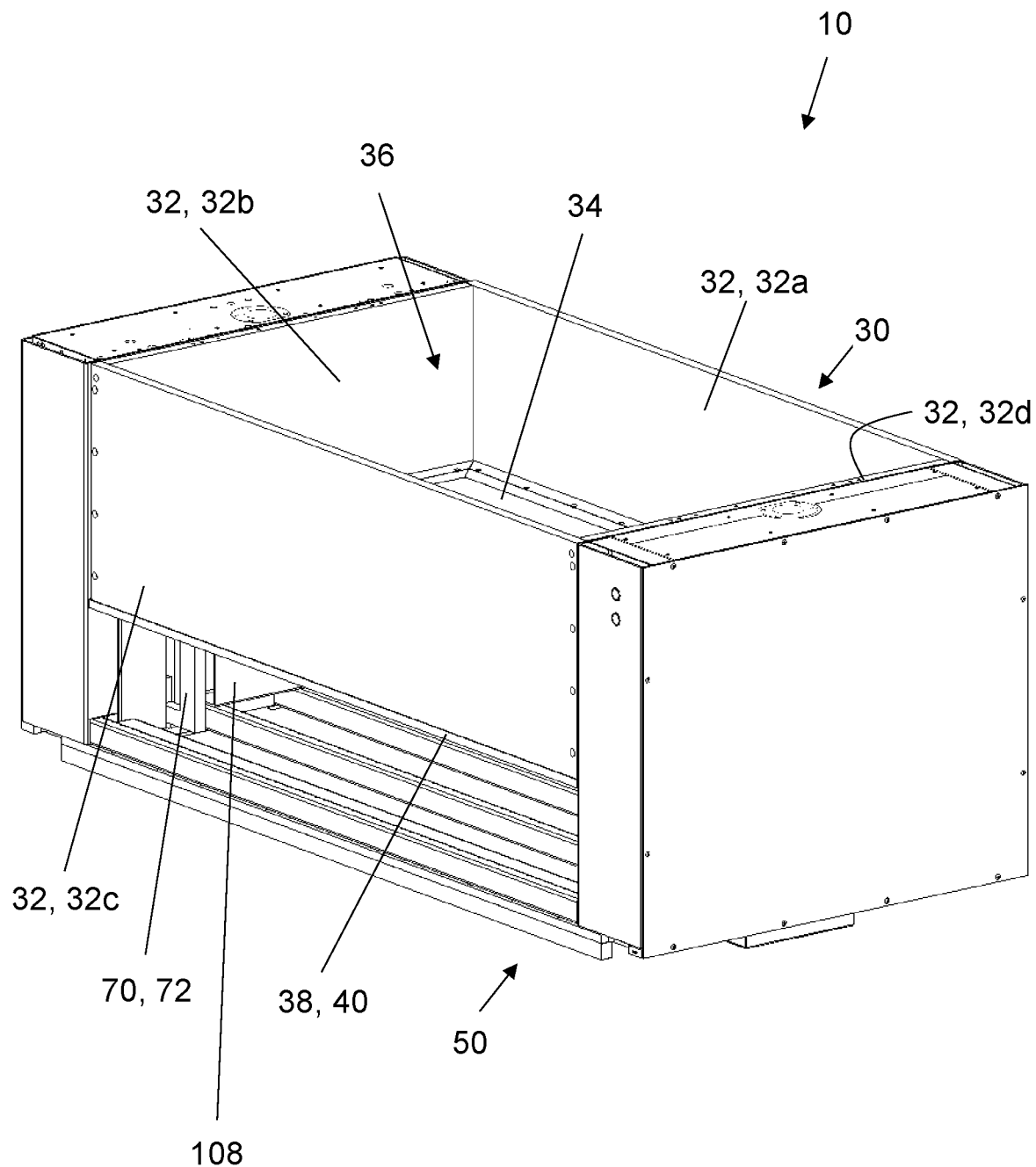
FIG. 12 shows a perspective view of a construction box system for a 3D printer according to a third embodiment.
Figure 13:
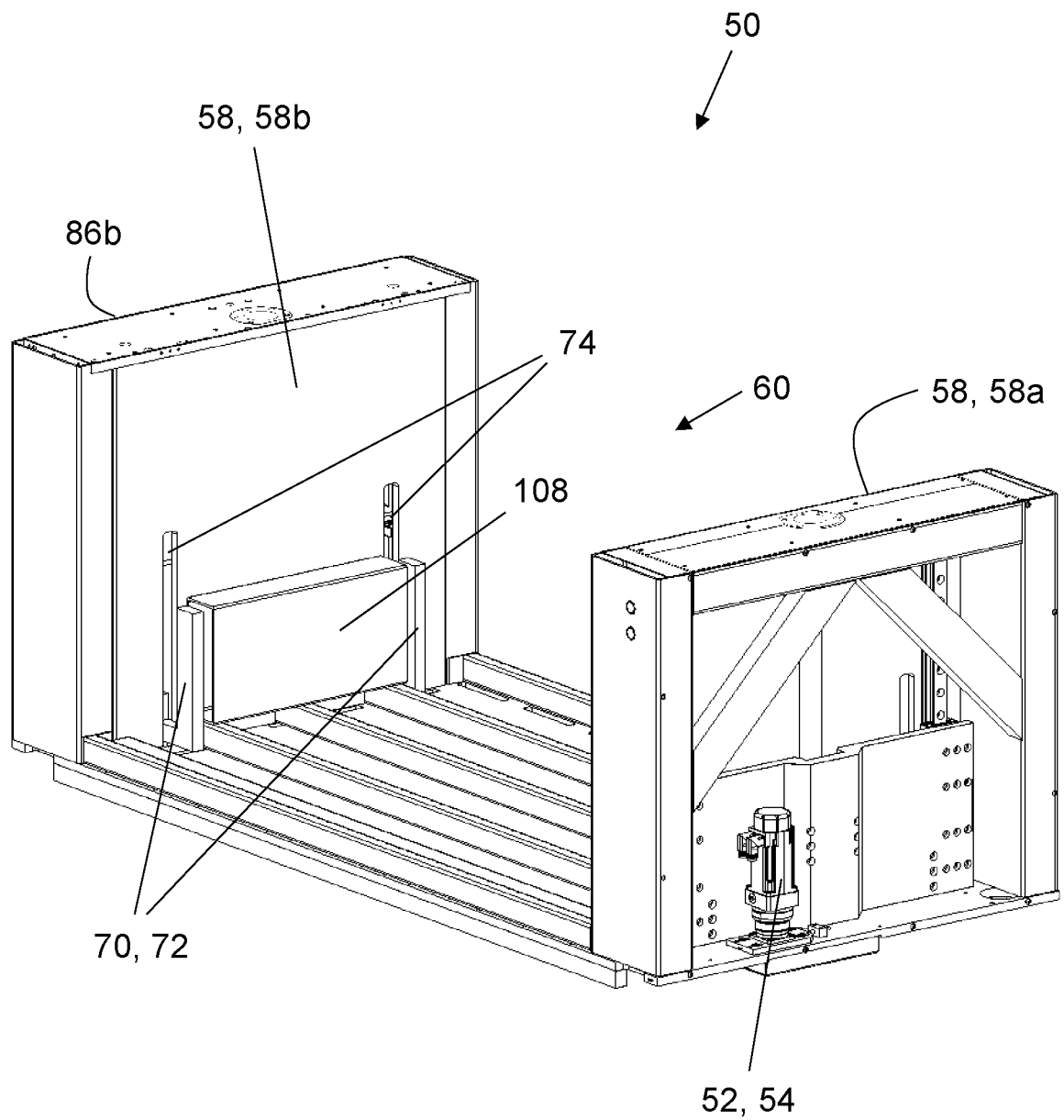
FIG. 13 shows the view of FIG. 12 with a cladding wall and the construction box having been omitted. Thus.
Figure 14:
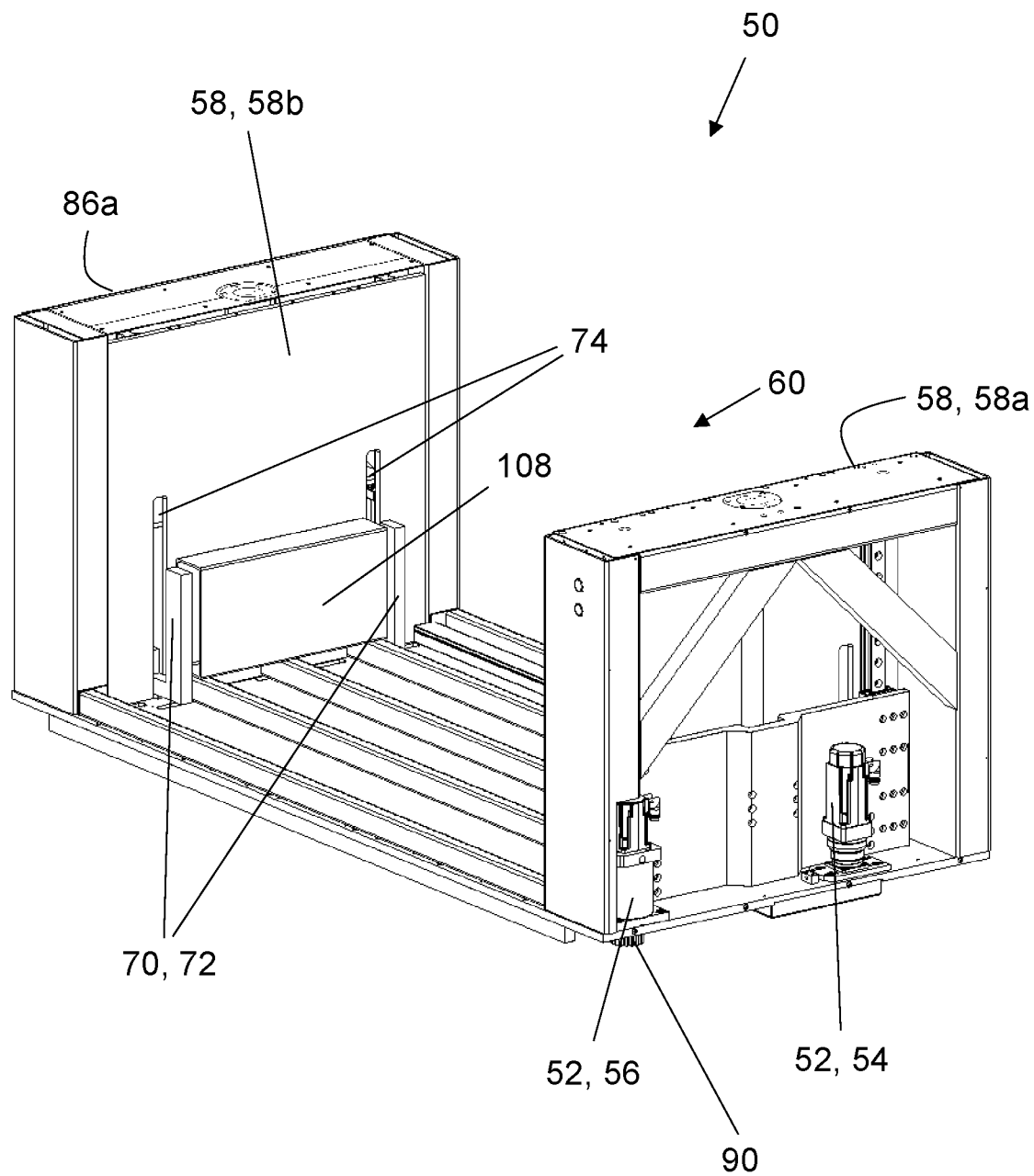
FIG. 14 shows a view of the view of the support structure shown in FIG. 13, rotated by 180° about a vertical axis of rotation, with a cladding wall having been omitted.
Figure 15:
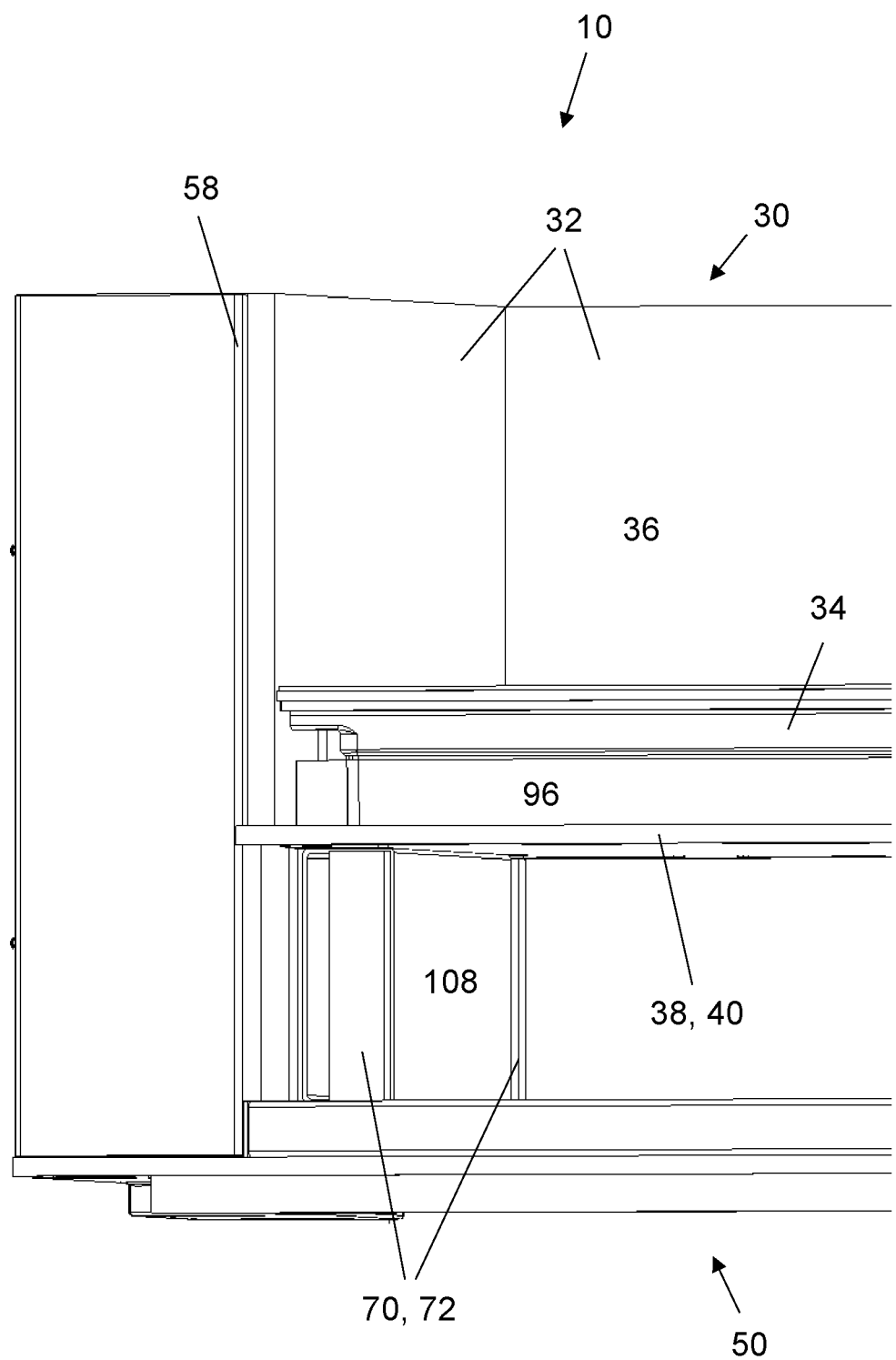
FIG. 15 shows another perspective view of the construction box system shown in FIG. 12, with a side wall of the construction box having been omitted.
Figure 16:
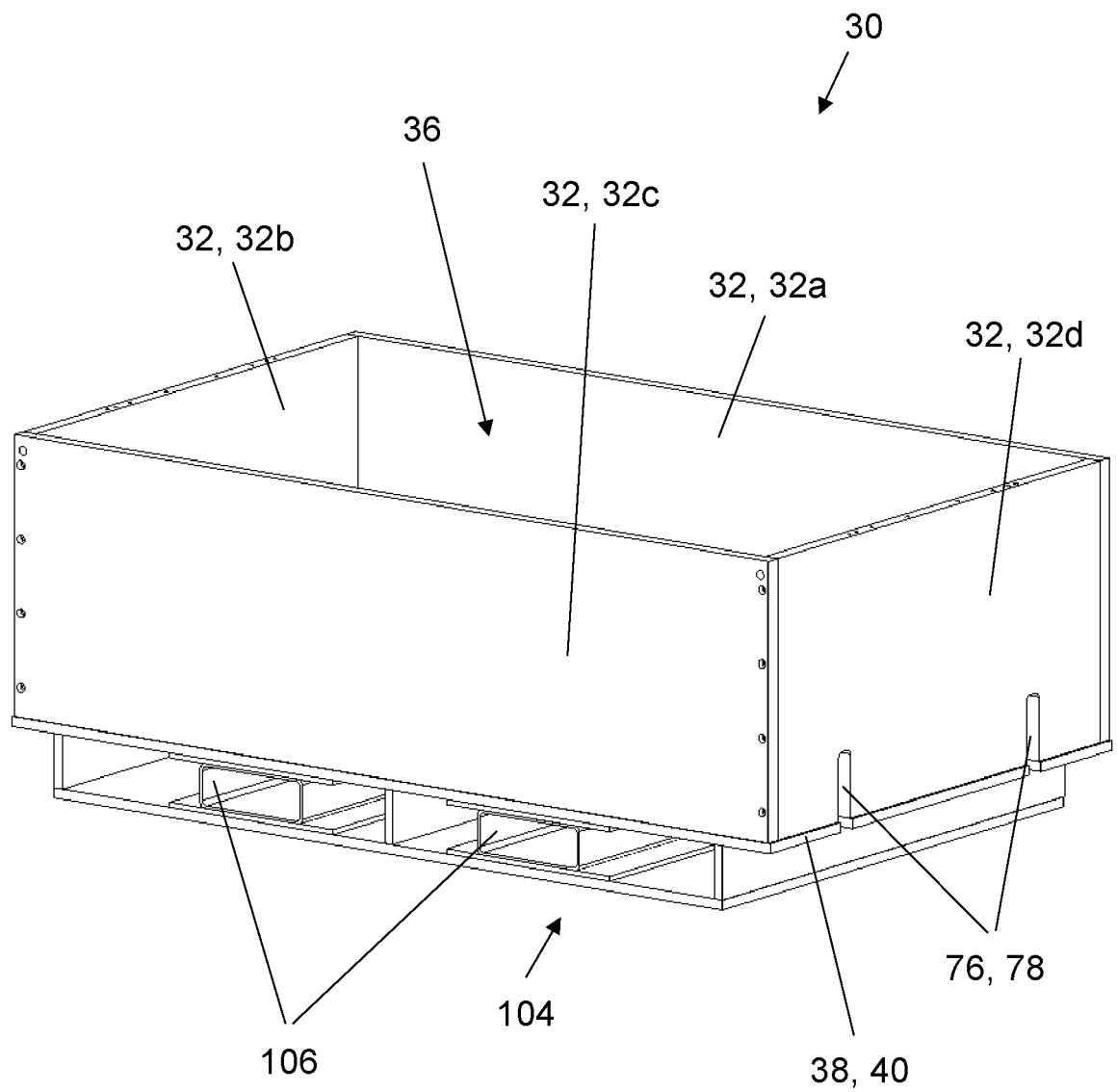
FIG. 16 shows a perspective view of a construction box for a construction box system for a 3D printer.
Figure 17:
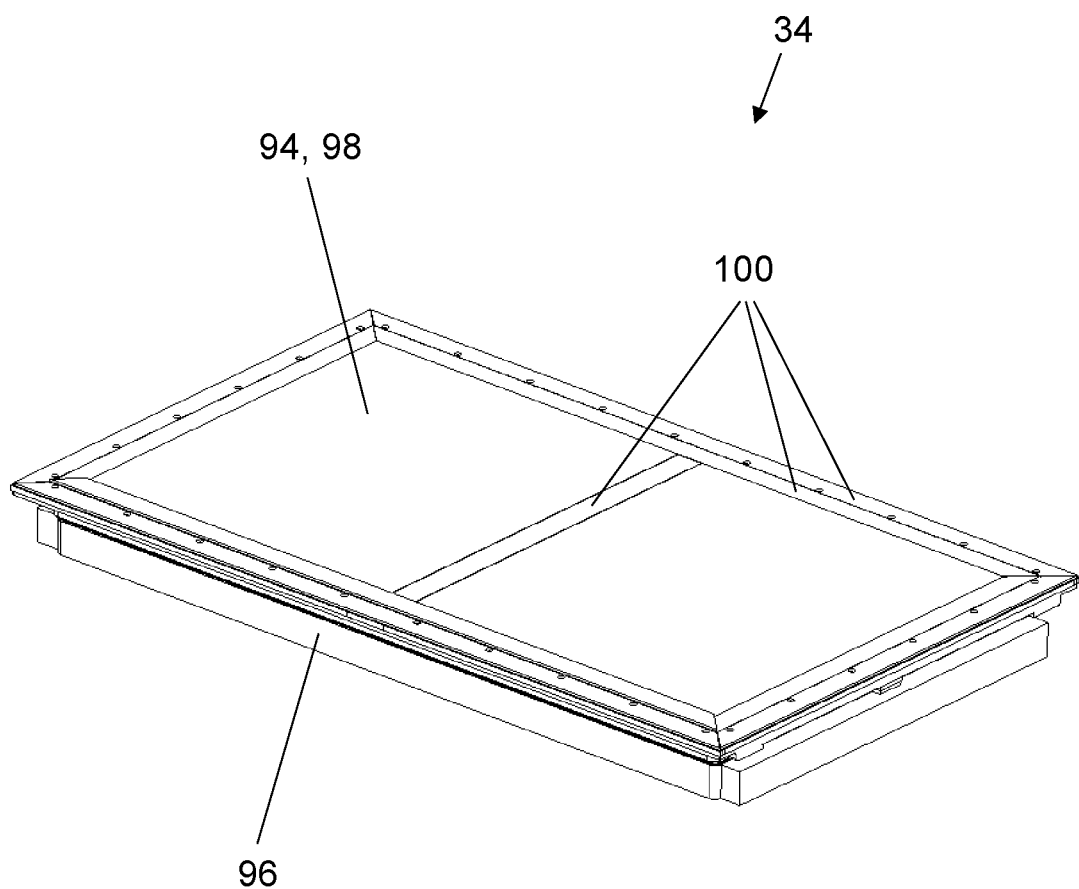
FIG. 17 shows a perspective view of a construction platform for a construction box for a construction box system for a 3D printer.
Figure 18:
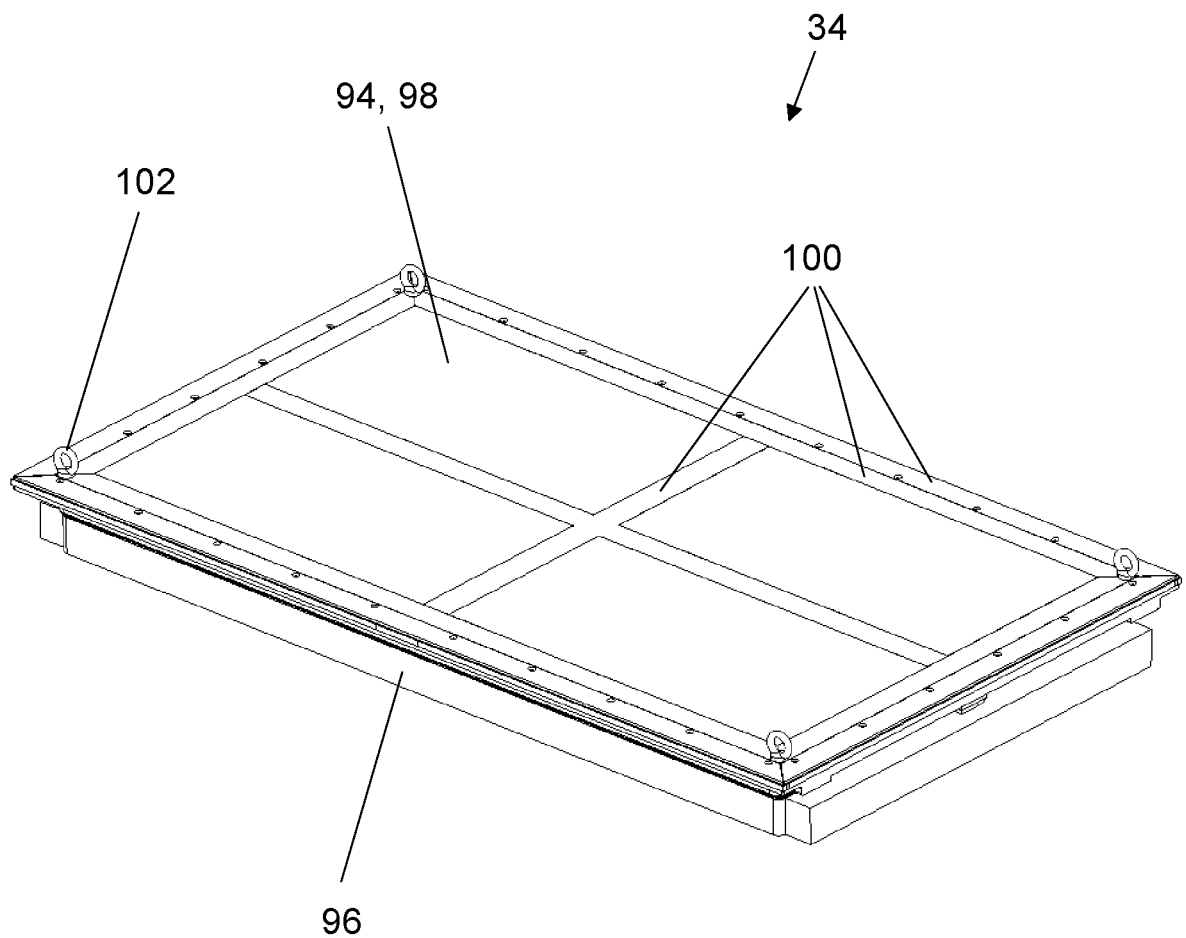
FIG. 18 shows a perspective view of a construction platform for a construction box for a construction box system for a 3D printer.
Figure 19:
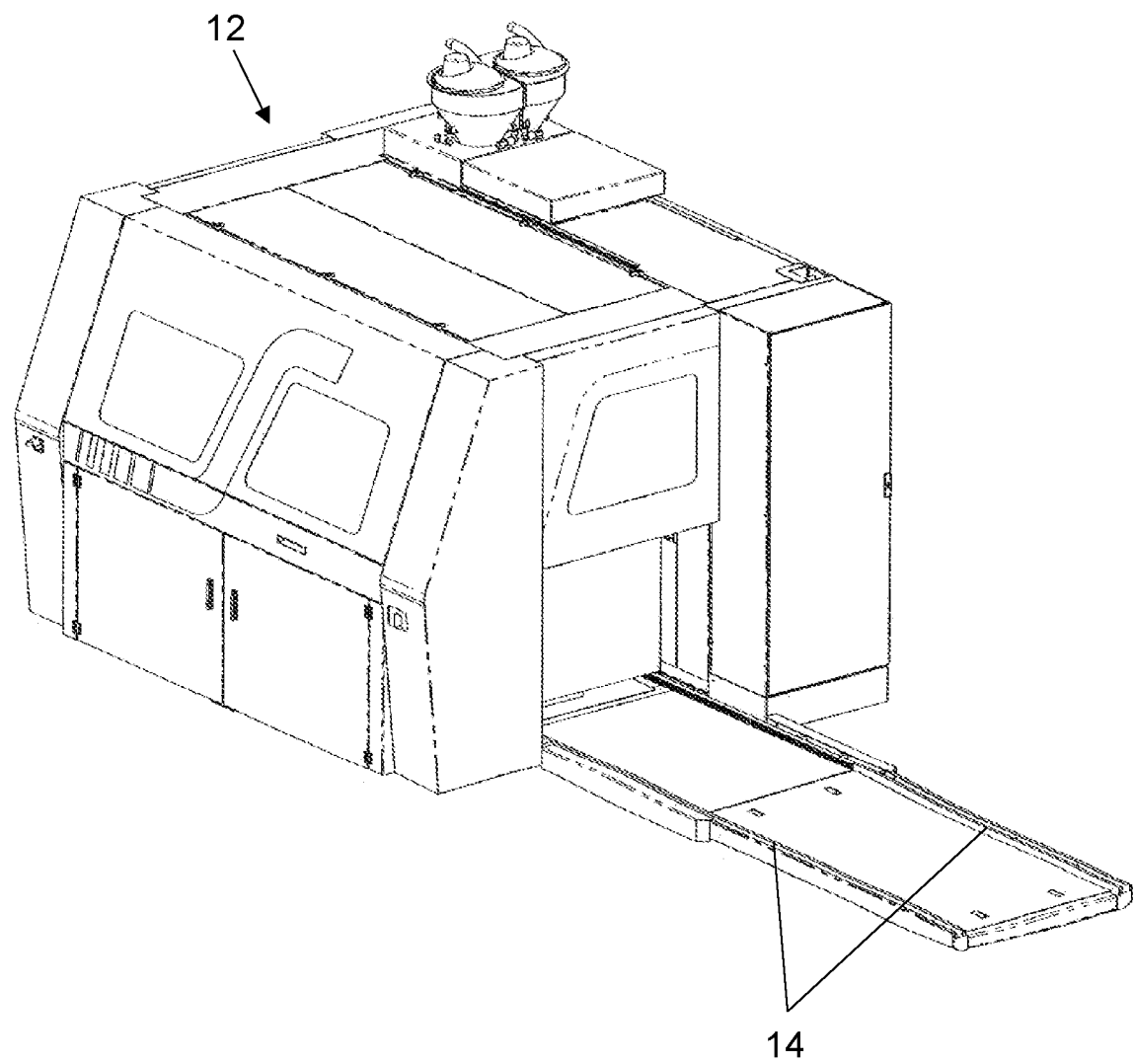
FIG. 19 shows a perspective view of a 3D printer.
Figure 20:
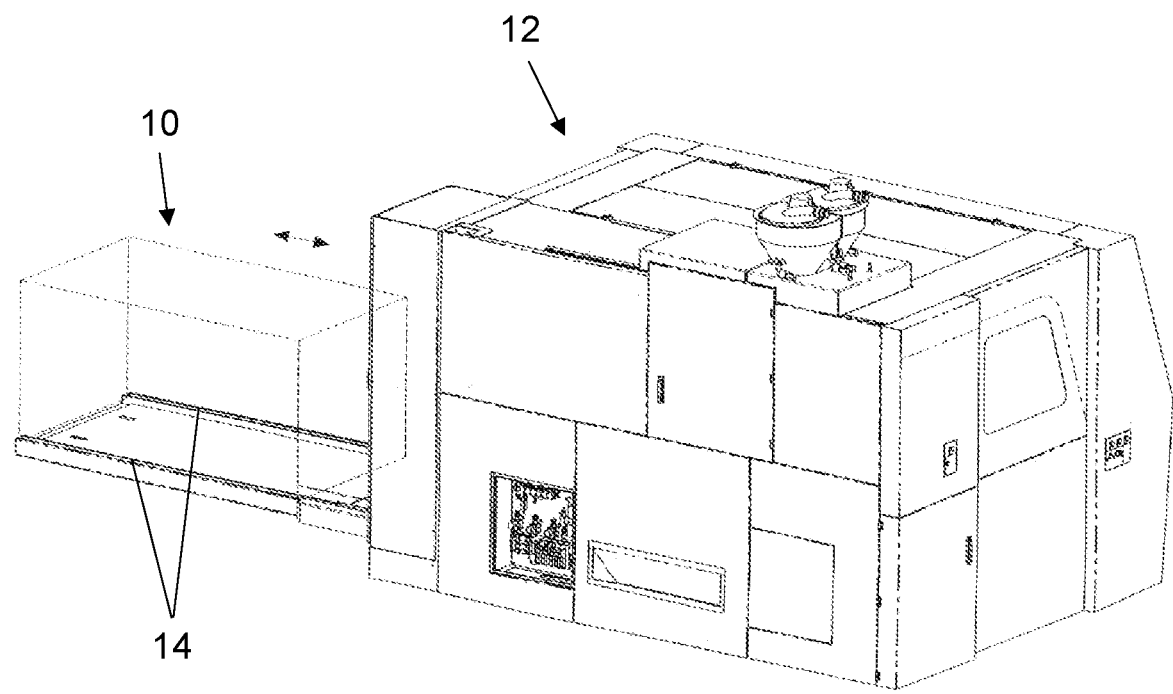
FIG. 20 shows another perspective view of the 3D printer shown in FIG. 19.

FIGS. 1 and 2 show perspective views of a construction box system 10 for a 3D printer 12 according to a first embodiment. FIGS. 3 to 5 show perspective views of the support structure 50 of the construction box system 10 for a 3D printer 12 according to the first embodiment. FIGS. 6 to 8 show perspective views of the construction box 30 of the construction box system 10 for a 3D printer 12 according to the first embodiment. FIGS. 9 and 10 show perspective views of the construction platform 34 of the construction box 30 of the construction box system 10 for a 3D printer 12 according to the first embodiment. FIG. 11 shows a perspective view of a construction box system 10 for a 3D printer 12 according to a second embodiment. FIG. 12 shows a perspective view of a construction box system 10 for a 3D printer 12 according to a third embodiment. FIGS. 13 and 14 show perspective views of the support structure 50 of the construction box system 10 for a 3D printer 12 according to the third embodiment. FIG. 15 shows a perspective view of the construction box system 10 for a 3D printer 12 according to the third embodiment. FIG. 16 shows a perspective view of a construction box 30 that may be used in a construction box system 10 for a 3D printer 12, for example in the construction box system 10 according to the third embodiment. FIGS. 17 and 18 show perspective views of construction platforms 34 that can be used in a construction box 30 of a construction box system 10 for a 3D printer 12, for example in a construction box 30 of a construction box system 10 according to the first, second or third embodiments. FIGS. 19 and 20 show perspective views of a 3D printer.

As shown in the Figures, a construction box system 10 for a 3D printer 12 according to the embodiments has a construction box 30 having a side wall structure 32 and a construction platform 34 received within the side wall structure 32, the side wall structure 32 defining an upwardly open construction box interior space 36 for building a component in 3D printing, downwardly limited by the construction platform 34, and a support structure 50 having its own drive 52 integrated into the support structure 50 and to which the construction box 30 is releasably attachable so that the construction box 30 can be repeatedly removed from the support structure 50 and subsequently reattached to the support structure 50 after building the component in the construction box interior space 36.

As shown, for example, in FIGS. 2 to 5, 13 and 14, the drive 52 integrated into the support structure 50 may comprise, for example, a lift drive 54 for adjusting the height of the construction platform 34, which is configured to adjust the construction platform 34 of the construction box 30 in height when the construction box 30 is attached to the support structure 50.

The lift drive 54 may be formed by, for example, two electric motors synchronized with each other, each having a vertical drive axis. The lift drive 54 (for example, each of the two electric motors) may be configured to drive a spindle drive 80, for example. The/each spindle drive 80 may, for example, comprise a rotatable screw spindle 82 having a vertical axis of rotation and a spindle nut 84. The screw spindle 82 may, for example, be connected to the lift drive 54, for example via a belt or a chain.

As shown, for example, in FIGS. 2, 3 and 14, the drive 52 integrated into the support structure 50 may comprise, for example, a travel drive 56 for moving the support structure 50, which is arranged to move the construction box system 10 between a first position, in which the construction box system 10 is arranged to build the component in the 3D printer 12, and a second position in which the construction box system 10 is arranged, for example, outside the 3D printer 12, for example along a rail system 14 or a roller system extending between the first and second positions (see, for example, FIGS. 19 and 20).

The travel drive 56 may be formed, for example, by an electric motor having a vertical drive axis. The travel drive 56 (for example, the electric motor) may be configured, for example, to drive a gear wheel 90 fixed to the support structure 50. The gear wheel 90 may, for example, be connected to the travel drive 56. The gear 90 may, for example, be attached to the lower side of the support structure 50 and/or may have a horizontal wheel plane and/or be a horizontal gear wheel. The gear wheel 90 fixed to the support structure 50 may, for example, be configured to cooperate with a rack, for which purpose the gear wheel 90 may, for example, be configured to engage and roll on the rack when driven by the travel drive 56, such that the construction box system 10 is movable along the rack.

For example, as shown in FIGS. 2 to 5, 13 and 14, the lift drive 54 and/or the spindle drive 80 and/or the travel drive 56 may be disposed, for example, in a space formed between a support structure side wall 58a, 58b and a cladding wall 86a, 86b. The lift drive 54 and/or the spindle drive 80 and/or the travel drive 56 may, for example, be arranged adjacent to the support structure side wall 58*a*, 58*b*, for example, on a side of the support structure side wall 58*a*, 58*b* facing away from the construction box 30.

The lift drive 54 and/or the travel drive 56 may, for example, be arranged outside the side wall structure 32 of the construction box 30 when the construction box 30 is attached to the support structure 50, for example, in a plan view of the construction box system 10 next to the construction box 30 adjacent to the side wall structure 32 of the construction box 30 and/or adjacent to at least one/the side wall 58*a*, 58*b* of the support structure 50, for example in the case of an elongated construction box 30 in a longitudinal direction in front of and/or behind the side wall structure 32 of the construction box 30 and/or in front of and/or behind at least one/the side wall 58*a*, 58*b* of the support structure 50.

The support structure 50 may be formed to be elongated, for example, and the lift drive 54 and/or the travel drive 56 may be disposed, for example, at at least one longitudinal end of the support structure 50.

As shown, for example, in FIGS. 12 and 15, the construction platform 34 may, for example, be engaged from below by one or more support structures 70, for example one or more support arms 72, in communication with and drivable by the lift drive 54 when the construction box 30 is attached to the support structure 50, wherein optionally one or more slots 74, 78 are formed in the side wall structure 32 of the construction box 30 and/or in a support structure side wall structure 58, through which the one or more support structures 70 extend.

As shown, for example, in FIG. 5, the support structure 70 may, for example, be connected to the spindle nut 84, for example, via a support structure fastening member 88 to which the support structure 70 is fastened and which is connected to the spindle nut 84.

The support structure 50 may comprise, for example, a support structure side wall structure 58 that surrounds the side wall structure 32 of the construction box 30 in a circumferential direction at least in sections, for example, surrounds it on both end faces of an elongated construction box 30.

The support structure side wall structure 58 may surround the side wall structure 32 of the construction box 30, for example, in a circumferential direction in sections, thereby forming a recess 60, the recess 60 being dimensioned, for example, such that the construction box 30 may be laterally removed from the support structure 50 and/or reattached to the support structure 50 through the recess 60. The support structure side wall structure 58 may comprise, for example, two opposing recesses 60, each dimensioned, for example, such that the construction box 30 may be laterally removed from the support structure 50 and/or reattached to the support structure 50 through the respective recess 60. The at least one recess 60 may, for example, extend along a long side of the side wall structure 32 of the construction box 30.

For example, as shown in FIGS. 1, 2, 11, 12, and 15, the construction box 30 may, for example, be supported by the support structure 50 such that an upper edge of the side wall structure 32 of the construction box 30 is disposed substantially at the same height as an upper edge of the support structure side wall structure 58 when the support structure 50 is disposed on the construction box 30.

For example, the support structure 50 may comprise at least one construction box support member 108 for supporting the construction box 30 when the construction box 30 is disposed on the support structure 50. For example, the construction box support member 108 may be disposed on the support structure side wall structure 58. For example, the support structure 50 may comprise two opposing construction box support members 108. The one or more support structures 70 may have, for example, a lower height (for example, a lower extension in a vertical direction) than the construction box support members 108 when the support structures 70 are in their lowermost position (see, for example, FIGS. 13 to 15).

For example, the construction box 30 may have a rectangular shape in a plan view, with two opposing short construction box side walls 32*b*, 32*d* and two opposing long construction box side walls 32*a*, 32*c*.

For example, as shown in FIGS. 6, 8, and 16, the construction box 30 may have, for example, on one or more construction box side walls 32*a*, 32*b*, 32*c*, 32*d*, for example on each of the short construction box side walls 32*b*, 32*d*, respectively one or more construction box side wall openings 76, for example in the form of one or more slots 78, the one or more construction box side wall openings 76 extending, for example, from a lower edge of the construction box side wall structure 32 vertically in an upward direction.

The construction box 30 may comprise, for example, a holding structure 38 configured to hold the construction platform 34 in a lowermost position in the construction box 30. For example, as shown in FIGS. 6 to 8 and 16, the holding structure 38 may, for example, comprise a plate 40 disposed on the construction box side wall structure 32. For example, the holding structure 38 (for example, the plate 40) may be configured such that the construction platform 34 (for example, an upper region of the construction platform 34) is disposed in its lowermost position above the one or more construction box side wall openings 76 (see, for example, FIGS. 7 and 8).

For example, the construction box 30 may comprise a construction box removal device 104 configured to attach the construction box 30 to the support structure 50 and/or to remove it from from the support structure 50. For example, the construction box removal device 104 may be disposed on the construction box side wall structure 32 of the construction box 30. The construction box removal device 104 may be disposed, for example, on the plate 40, for example, under the plate 40, for example, on a side of the plate 40 facing away from the construction box interior space 36. The construction box removal device 104 may comprise, for example, two forklift pockets 106 into which the fork of a forklift may engage and which are configured, respectively, to be engaged by the fork of a forklift.

The support structure 50 may be, for example, microwave-incompatible and/or the construction box 30 may be, for example, microwave-compatible. The construction box 30 may, for example, be free of a drive means and/or have no active elements. The side wall structure 32 of the construction box 30 may be, for example, made of ceramic, metal, for example, cast metal, stainless steel, or combinations thereof.

The construction platform 34 may comprise, for example, a metal floor, for example a cast metal floor, or a stainless steel floor, or a ceramic floor. A heating device may be disposed on and/or in the construction platform 34, for example. The construction platform 34 may comprise, for example, an outlet device, for example comprising a perforated floor and a closure device, to remove particulate material from the construction box interior space 36.

As shown, for example, in FIGS. 9, 10, 17, and 18, the construction platform 34 may comprise, for example, a floor 94 and a floor support structure 96 against which the floor 94 is supported. The floor 94 may comprise, for example, one or more floor plates 98 that may be enclosed by, for example, a floor plate frame structure 100. The floor support structure 96 may have, for example, a honeycomb-shaped structure. Floor plates 98 and/or floor plate frame structure 100 and/or floor support structure 96 may be made of metal, for example, cast metal, stainless steel, and/or ceramic. A construction platform removal device 102 may be attachable to the construction platform 34, for example, configured to remove the construction platform 34 from the side wall structure 32 of the construction box 30 (for example, in FIG. 18, the construction platform removal device 102 is formed by four eyebolts screwable into a thread provided on the construction platform 34; prior to a 3D printing process, the eyebolts must be removed from the construction platform 34).

The construction box system 10 may, for example, comprise one or more further construction boxes 30 each exchangeable for the first construction box 30 and attachable to the support structure 50, wherein the one or more further construction boxes 30 may, for example, be formed as described above and/or may be different from the first construction box 30. The construction box system 10 may, for example, comprise one or more further construction platforms 34 each exchangeable for the first construction platform 34 and receivable in the side wall structure 32 of the construction box 30, wherein the one or more further construction platforms 34 may, for example, be formed as described above and/or may be different from the first construction platform 34. The construction box system 10 may for example comprise a rail system 14 or roller system along which the support structure 50 with construction box 30 attached thereto is movable, for example by means of its own travel drive 56 integrated in the support structure 50.

The construction box system 10 may, for example, comprise a control device arranged to control the lift drive 54 and/or the travel drive 56 and/or the heating device and/or the outlet device. For example, the control device may be integrated into the support structure 50 and/or integrated into the 3D printer. For example, as shown in FIG. 11, the construction box system 10 may comprise, for example, a control box 92 disposed on the support structure 50 and in which the control device is disposed (control device integrated into the support structure 50). In addition, the control box 92 may also have, for example, at least one accumulator arranged therein to supply power to the drive of the support structure.

A 3D printer 12 may, for example, comprise the construction box system 10 described above, and may further comprise a coater for application of particulate material in layers onto the construction platform 34 and/or a print head for selective printing of the particulate material using a binder jetting method.

For example, a 3D printer system may comprise the 3D printer 12 described above and may further comprise an unpacking station for unpacking the built components from the construction box 30 and/or a microwave device and/or an oven, in which the construction box 30 is receivable, for curing and/or drying the component disposed in the construction box 30.

The construction box system 10 described above, the 3D printer 12 described above, and/or the 3D printing system described above may be used, for example, to 3D print casting molds and/or casting cores and/or to apply particulate material in layers to the construction platform 34 and selectively print the particulate material using a binder jetting method.

For example, a 3D printing method may include the following steps:
- (a) providing a/the above-described construction box system 10 to a 3D printer 12, wherein the construction box 30 is attached to the support structure 50,
- (b) building a component by 3D printing in the construction box interior space 36 of the construction box 30,
- (c) removing the construction box 30 from the support structure 50, for example in an automated manner, and further
- (d1) supplying the removed construction box 30 to a post process, such as
  - (d1a) unpacking the built components from the removed construction box 30, for example in an unpacking station, and/or
  - (d1b) curing and/or drying the built components in the removed construction box 30, for example in a microwave device and/or an oven, and/or
- (d2) attaching a construction box 30 to the support structure 50, for example reattaching the same construction box 30 after the built components have been unpacked, or attaching a different construction box 30, optionally followed by rebuilding a component by 3D printing in the construction box interior space 36 of the construction box 30.

The invention claimed is:

1. A construction box system for a 3D printer, comprising:
a construction box having a side wall structure and a construction platform received within the side wall structure, the side wall structure limiting an upwardly open construction box interior space for building a component by 3D printing, the interior space being downwardly limited by the construction platform; and
a support structure comprising its own drive integrated into the support structure and to which the construction box is releasably attachable, so that the construction box can be repeatedly removed from the support structure after building the component in the construction box interior space and can be subsequently reattached to the support structure,
wherein the drive integrated into the support structure comprises a travel drive for moving the support structure, which is configured to move the construction box system between a first position, in which the construction box system is arranged for building up the component in the 3D printer, and a second position, in which the construction box system is arranged outside the 3D printer.

2. The construction box system for a 3D printer according to claim 1, wherein the drive integrated into the support structure further comprises:
a lift drive for adjusting in height the construction platform, which is configured to adjust the construction platform of the construction box in height when the construction box is attached to the support structure.

3. The construction box system for a 3D printer according to claim 2, wherein,
when the construction box is attached to the support structure and the lift drive and/or the travel drive is arranged outside the side wall structure of the construction box as seen from above in a top view of the construction box system next to the construction box adjacent to the side wall structure of the construction box
the support structure is elongated, and the lift drive and/or the travel drive are arranged at an at least one longitudinal end of the support structure.

4. The construction box system (10) for a 3D printer according to claim 1,
wherein the support structure comprises a support structure side wall structure that surrounds the side wall structure of the construction box at least in sections at the two end faces of an elongated construction box.

5. The construction box system for a 3D printer according to claim 4,
wherein the support structure side wall structure surrounds the side wall structure of the construction box in sections so as to form at least one recess which is dimensioned such that the construction box can be laterally removed from the support structure and/or reattached to the support structure through the at least one recess.

6. The construction box system (10) for a 3D printer according to claim 4,
wherein, with the construction box disposed on the support structure, the construction box is supported by the support structure such that an upper edge of the side wall structure of the construction box is disposed substantially at the same height with an upper edge of the support structure side wall structure.

7. The construction box system for a 3D printer according to claim 1,
wherein the construction box has a rectangular shape in a plan view, with two opposing short construction box side walls and two opposing long construction box side walls.

8. The construction box system (10) for a 3D printer according to claim 7,
wherein the construction box has on each of the short construction box side walls, respectively one or more construction box side wall openings in the form of one or more slots, the one or more construction box side wall openings extending vertically in an upward direction from a lower edge of the construction box side wall structure.

9. The construction box system for a 3D printer according to claim 8,
wherein the construction box comprises a holding structure configured to hold the construction platform in a lowermost position in the construction box,
wherein the holding structure comprises a plate disposed on the construction box side wall structure.

10. The construction box system for a 3D printer according to claim 1,
wherein the side wall structure of the construction box is made of ceramic, metal, stainless steel, or combinations thereof, and/or
wherein the support structure is microwave-incompatible and/or the construction box is configured to be microwave-compatible, and/or
wherein the construction box is free of a drive means and/or has no active elements.

11. The construction box system for a 3D printer according to claim 1, further comprising
one or more further construction boxes, which are respectively exchangeable for the construction box and attachable to the support structure, wherein the one or more further construction boxes are different from the first construction box.

12. The construction box system for a 3D printer according to claim 2, wherein the construction platform is engaged from below under by one or more support structures which are connected to the lift drive and capable of being driven by the lift drive when the construction box is attached to the support structure.

13. The construction box system for a 3D printer according to claim 12, wherein one or more slots are formed in the side wall structure of the construction box and/or in a support structure side wall structure, through which slots the one or more support structures extend.

14. The construction box system for a 3D printer according to claim 5,
wherein the support structure side wall structure comprises two opposing recesses, each dimensioned such that the construction box can be laterally removed from the support structure and/or reattached to the support structure through the respective recess, and
wherein the at least one recess extends along a long side of the side wall structure of the construction box.

15. The construction box system for a 3D printer according to claim 8, wherein the holding structure is configured so that the construction platform is disposed in its lowermost position above the one or more construction box side wall openings.

16. The construction box system for a 3D printer according to claim 1,
wherein the construction platform comprises a metal floor, or a stainless steel floor or a ceramic floor.

17. The construction box system for a 3D printer according to claim 1,
wherein a heating device is arranged on and/or in the construction platform, and/or
wherein the construction platform comprises an outlet device comprising a perforated floor and a closure device, to remove particulate material from the construction box interior space.

18. The construction box system for a 3D printer according to claim 1,
wherein the support structure is microwave-incompatible and/or the construction box is configured to be microwave-compatible.

19. The construction box system for a 3D printer according to claim 1,
wherein the construction box is free of a drive means and/or has no active elements.

20. The construction box system for a 3D printer according to claim 1, further comprising:
one or more further construction platforms which are respectively exchangeable for the construction platform and receivable in the side wall structure of the construction box, and/or
a rail system or roller system along which the support structure with the construction box attached thereto is moveable by means of its own travel drive integrated in the support structure according, and/or
a control device configured to control the lift drive and/or the travel drive and/or the heating device and/or the outlet device.

* * * * *